US011874656B2

(12) United States Patent
Bethke et al.

(10) Patent No.: US 11,874,656 B2
(45) Date of Patent: *Jan. 16, 2024

(54) UNMANNED AERIAL VEHICLE MODULAR COMMAND PRIORITY DETERMINATION AND FILTERING SYSTEM

(71) Applicant: Skydio, Inc., Redwood, CA (US)

(72) Inventors: Brett Michael Bethke, Millbrae, CA (US); Bernard J. Michini, San Francisco, CA (US); Jonathan Anders Lovegren, San Francisco, CA (US); Patrick Michael Bouffard, Albany, CA (US)

(73) Assignee: Skydio, Inc., San Mateo, CA (US)

( * ) Notice: Subject to any disclaimer, the term of this patent is extended or adjusted under 35 U.S.C. 154(b) by 648 days.

This patent is subject to a terminal disclaimer.

(21) Appl. No.: 15/583,097

(22) Filed: May 1, 2017

(65) Prior Publication Data

US 2017/0285631 A1 Oct. 5, 2017

Related U.S. Application Data

(63) Continuation of application No. 15/132,106, filed on Apr. 18, 2016, now Pat. No. 9,658,619.

(Continued)

(51) Int. Cl.
*G05D 1/00* (2006.01)
*G08G 5/00* (2006.01)
(Continued)

(52) U.S. Cl.
CPC ......... *G05D 1/0016* (2013.01); *B64C 39/024* (2013.01); *G05D 1/0011* (2013.01);
(Continued)

(58) Field of Classification Search
CPC .... G05D 1/0016; G05D 1/102; G05D 1/0011; G05D 1/0061; G05D 1/0088;
(Continued)

(56) References Cited

U.S. PATENT DOCUMENTS 6,498,698 B1 12/2002 Golowka et al.
6,498,968 B1 * 12/2002 Bush .................... G05B 13/048
701/1

(Continued)

FOREIGN PATENT DOCUMENTS

CN 105676872 A * 6/2016

OTHER PUBLICATIONS

ArduPilot Autopilot Suite. User Documentation [online]. ArduPilot Dev Team, 2023 [retrieved on Jan. 31, 2023]. Retrieved from the Internet: <URL: https://ardupilot.org/copter/docs/common-mavlink-mission-command-messages-mav_cmd.html> (Year: 2023).*

(Continued)

*Primary Examiner* — Peter D Nolan
*Assistant Examiner* — Peter Y Ning

(57) ABSTRACT

Methods, systems, and apparatus, including computer programs encoded on computer storage media, for unmanned aerial vehicle modular command priority determination and filtering system. One of the methods includes enabling control of the UAV by a first control source that provides modular commands to the UAV, each modular command being a command associated with performance of one or more actions by the UAV. Modular commands from a second control source requesting control of the UAV are received. The second control source is determined to be in control of the UAV based on priority information associated with each control source. Control of the UAV is enabled by the second control source, and modular commands are implemented.

26 Claims, 10 Drawing Sheets

Related U.S. Application Data

(60) Provisional application No. 62/315,903, filed on Mar. 31, 2016.

(51) Int. Cl.
  *B64C 39/02* (2023.01)
  *G05D 1/10* (2006.01)
  *B64U 10/13* (2023.01)
  *B64U 101/30* (2023.01)
  *B64D 47/08* (2006.01)

(52) U.S. Cl.
  CPC ......... *G05D 1/0061* (2013.01); *G05D 1/0088* (2013.01); *G05D 1/102* (2013.01); *G08G 5/0069* (2013.01); *B64D 47/08* (2013.01); *B64U 10/13* (2023.01); *B64U 2101/30* (2023.01); *B64U 2201/10* (2023.01); *B64U 2201/104* (2023.01); *B64U 2201/20* (2023.01)

(58) Field of Classification Search
  CPC ............... G08G 5/0069; B64C 39/024; B64C 2201/145; B64C 2201/027; B64C 2201/127; B64C 2201/146; B64C 2201/141; B64C 2201/123; B64D 47/08
  See application file for complete search history.

(56) References Cited

U.S. PATENT DOCUMENTS

| | | | |
|---|---|---|---|
| 8,260,479 B2* | 9/2012 | Christenson | G05D 1/0088 324/163 |
| 8,515,609 B2 | 8/2013 | Mcandrew et al. | |
| 8,600,602 B1 | 12/2013 | Mcandrew et al. | |
| 9,108,729 B2* | 8/2015 | Duggan | G05D 1/0061 |
| 9,127,908 B2 | 9/2015 | Miralles | |
| 9,221,538 B2 | 12/2015 | Takahashi et al. | |
| 9,256,225 B2 | 2/2016 | Downey et al. | |
| 9,256,994 B2 | 2/2016 | Downey et al. | |
| 9,273,981 B1 | 3/2016 | Downey et al. | |
| 9,310,221 B1 | 4/2016 | Downey et al. | |
| 9,311,760 B2 | 4/2016 | Downey et al. | |
| 9,340,283 B1 | 5/2016 | Downey et al. | |
| 9,403,593 B2 | 8/2016 | Downey et al. | |
| 9,406,237 B2 | 8/2016 | Downey et al. | |
| 9,412,278 B1* | 8/2016 | Gong | G06F 16/29 |
| 9,607,522 B2 | 3/2017 | Downey et al. | |
| 9,658,619 B1 | 5/2017 | Bethke et al. | |
| 9,693,547 B1* | 7/2017 | Moitier | A01M 5/02 |
| 9,817,396 B1* | 11/2017 | Takayama | G05D 1/0038 |
| 2006/0121418 A1* | 6/2006 | DeMarco | F41H 13/00 434/11 |
| 2007/0244608 A1* | 10/2007 | Rath | G05D 1/0038 701/3 |
| 2007/0252029 A1* | 11/2007 | Karem | G08G 5/0021 244/1 R |
| 2010/0084513 A1* | 4/2010 | Gariepy | B64C 39/024 244/190 |
| 2010/0145556 A1* | 6/2010 | Christenson | G06F 8/36 701/15 |
| 2010/0198514 A1 | 8/2010 | Miralles | |
| 2011/0035149 A1* | 2/2011 | McAndrew | G05D 1/0038 701/466 |
| 2011/0130913 A1* | 6/2011 | Duggan | G05D 1/0061 701/23 |
| 2012/0091284 A1 | 4/2012 | Goodarzi | |
| 2012/0123628 A1 | 5/2012 | Duggan et al. | |
| 2012/0203450 A1 | 8/2012 | Meyer et al. | |
| 2013/0311009 A1 | 11/2013 | Mcandrew et al. | |
| 2014/0032034 A1* | 1/2014 | Raptopoulos | H04B 7/18506 701/25 |
| 2014/0324253 A1 | 10/2014 | Duggan et al. | |
| 2015/0120094 A1 | 4/2015 | Kimchi et al. | |
| 2015/0225081 A1* | 8/2015 | Stabler | B64C 39/024 701/3 |
| 2015/0234387 A1* | 8/2015 | Mullan | H04L 67/12 701/28 |
| 2016/0026515 A1* | 1/2016 | Frey | G06F 9/546 719/313 |
| 2016/0068267 A1* | 3/2016 | Liu | G05D 1/0088 701/4 |
| 2016/0070260 A1 | 3/2016 | Levien et al. | |
| 2016/0070264 A1* | 3/2016 | Hu | G05D 1/0011 701/2 |
| 2016/0071419 A1 | 3/2016 | Heilman | |
| 2016/0071420 A1 | 3/2016 | Heilman | |
| 2016/0114903 A1 | 4/2016 | Claudel et al. | |
| 2016/0203723 A1* | 7/2016 | Kube | G08G 5/0026 701/3 |
| 2016/0285774 A1 | 9/2016 | Downey et al. | |
| 2016/0288905 A1* | 10/2016 | Gong | G08G 5/0082 |
| 2016/0364004 A1* | 12/2016 | Ekandem | G06F 1/1694 |
| 2016/0370800 A1* | 12/2016 | Chau | G05D 1/0022 |
| 2017/0146995 A1* | 5/2017 | Stamatovski | G05D 1/0027 |
| 2017/0205826 A1* | 7/2017 | Smith | G05D 1/0094 |
| 2017/0255802 A1* | 9/2017 | Falk | G08G 5/0021 |
| 2018/0231972 A1* | 8/2018 | Woon | G08G 5/0069 |
| 2018/0233054 A1* | 8/2018 | Woon | G08G 5/0056 |
| 2019/0011921 A1* | 1/2019 | Wang | G05D 1/106 |

OTHER PUBLICATIONS

Meier, L. The MAVLink Micro Air Vehicle Communication Protocol, Mar. 30, 2016 [online] [retreived on Jan. 24, 2022]. Retrieved from the Internet: <URL:https://web.archive.org/web/20160330202712/http://qgroundcontrol.org:80/mavlink/start> (Year: 2016).*

QGroundControl User Guide [online]. QGroundControl Dev Team, 2022 [retrieved on Aug. 2, 2022]. Retrieved from the Internet: <URL: https://docs.qgroundcontrol.com/master/en/> (Year: 2022).*

ArduPilot Autopilot Suite. User Documentation [online]. ArduPilot Dev Team, 2022 [retrieved on Aug. 3, 2022]. Retrieved from the Internet: <URL: https://ardupilot.org/planner/docs/mission-planner-overview.html> (Year: 2022).*

Meier, L. The MAVLink Micro Air Vehicle Communication Protocol Aug. 14, 2015 [online] [retreived on Aug. 11, 2023]. Retrieved from the Internet <URL: https://github.com/mavlink/c_library_v1/blob/753b694df1901f17239a03b1f110333319636638/minimal/mavlink_msg_heartbeat.h> (Year: 2015).*

International Search Report and Written Opinion for International Application No. PCT/US2017/024595 dated Jul. 21, 2017, 9 pages.

* cited by examiner

UNMANNED AERIAL VEHICLE MODULAR
COMMAND PRIORITY DETERMINATION
AND FILTERING SYSTEM

CROSS-REFERENCE TO RELATED APPLICATIONS

Any and all applications for which a foreign or domestic priority claim is identified in the Application Data Sheet as filed with the present application are hereby incorporated by reference in their entirety under 37 CFR 1.57.

BACKGROUND

Unmanned aerial vehicles (UAVs) may conduct flight plans to perform tasks, including traveling to waypoints, recording video, and so on. A waypoint may include an identification of longitude and latitude coordinates, and the flight plan can specify an order associated with visiting the waypoints.

SUMMARY

In general, one innovative aspect of the subject matter described in this specification can be embodied in methods that include the actions of enabling control of the UAV by a first control source that provides modular commands to the UAV, each modular command being a command associated with performance of one or more actions by the UAV; receiving, from a second control source requesting control of the UAV, one or more modular commands; determining that the second control source is to be in control of the UAV based, at least in part, on priority information associated with each control source; and enabling control of the UAV by the second control source, and implementing the one or more modular commands.

Particular embodiments of the subject matter described can be implemented so as to realize one or more of the following advantages. Complex flight commands and actions of an unmanned aerial vehicle (UAV) can be packaged together into succinct modular flight commands (also called modular command(s)) which a navigating (e.g., flying) UAV can interpret and effect. In this way, application programs which utilize the modular flight commands for ease of development can be created to execute on UAVs, and cause the UAVs to perform complicated maneuvers, inspections, and so on. For instance, a UAV can execute particular application programs to perform damage inspection of a vertical structure, while another application program can be related to determining weather damage of a roof. These application programs can be maintained in an electronic application store available over the Internet, and entities (e.g., businesses, persons) interested in flying UAVs can obtain application programs related to specific functionality for execution on the UAVs. Additionally, the UAV can ensure that execution of the modular flight commands will result in a safe operation of the UAV (e.g., the UAV will not exceed air speed limits, the UAV will remain in an approved geofence, the UAV will not perform a maneuver not commensurate with its flight capabilities). In this way, application programs can be executed on UAVs, and operators of UAV flights can have assurances that the flights will be safe.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
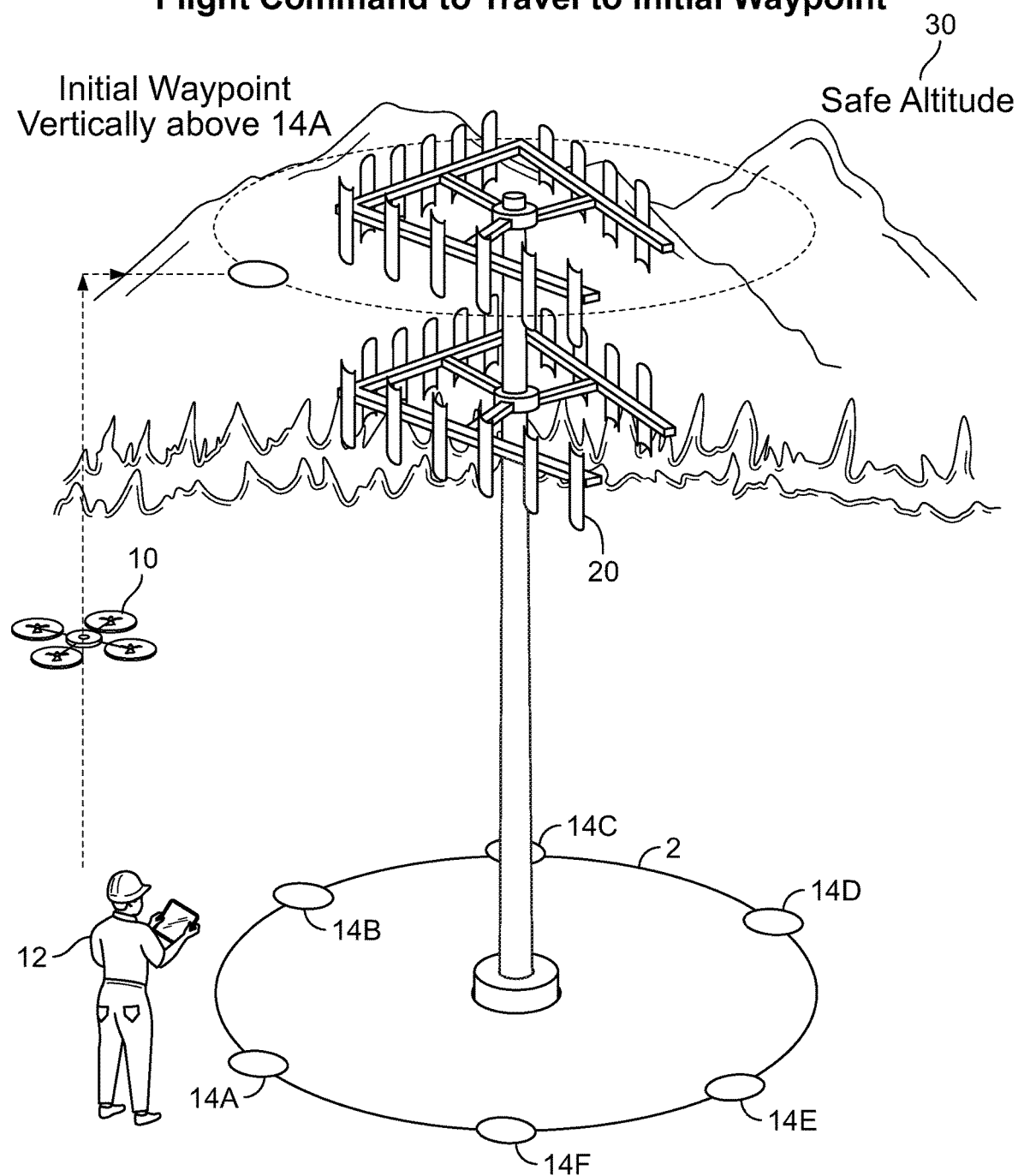
FIG. 1A illustrates an example diagram of an unmanned aerial vehicle (UAV) implementing one or more initial modular flight commands.

Among other features, this specification describes systems and methods for prioritizing control sources vying for command and control of an unmanned aerial vehicle (UAV) implementing a flight plan. The UAV ensures that a single control source is in control of the UAV at any given time based on a prioritization of each control source. In this specification, a control source includes any system, or executable code, that requests control of the UAV (e.g., control of movement of the UAV, control of sensors, payload modules included in the UAV), and provides commands (e.g., instructions) to control the UAV. A non-exhaustive list of examples, which will be described further, of a control source can include (1) an application executing on a UAV computer system (e.g., source determination system 200 described below) that implements a particular task or functionality associated with a flight plan being implemented (e.g., inspection of a structure or area for damage), or (2) a contingency handler executing on the UAV computer system, or (3) an operator utilizing a user device in wireless communication with the UAV to request direct control, or (4) an application executing on a user device automatically navigating the UAV, and so on. By actively determining which control source is to be in control of the UAV, the UAV can ensure that a resulting flight plan is implemented safely, and for example, if a problem with the flight plan is determined, a contingency handler can execute and handle the determined problem, before implementation of the flight plan is resumed.

As will be described, application programs can be created for execution on a UAV computer system to effect particular functionality. For instance, application programs can be created to cause a UAV to identify damage on a vertical structure, such as a cell-phone tower, a bridge, a nuclear power plant cooling tower, and so on. In another instance, application programs can be created to work in concert with other application programs. As an example, a first application program can be associated with controlling a flight plan of the UAV, and causing the UAV to travel to particular waypoints, while a second application program can be associated with activating included sensors (e.g., measuring radiation, identifying hail damage on a roof). In this way, an operator of the UAV can modify the second application depending on a task associated with operating the UAV, while retaining the first application, enabling the operator to quickly swap between tasks and perform disparate functionality. The application programs can be maintained in an electronic application store (e.g., an "app" store that maintains multitudes of applications associated with implementing particular tasks), which can be available for download and storage on a UAV.

An application program may provide modular flight commands for the UAV to implement, with each modular flight command describing one or more actions the UAV is to perform. For example, a modular flight command can cause the UAV to ascend from a take-off location, and travel to a particular waypoint (e.g., geospatial reference such as longitude and latitude) at a particular altitude. The example modular flight command can include parameters that identify the particular waypoint, the particular altitude, and any other parameters necessary for the UAV to implement the modular flight command. The UAV can include a flight control system (e.g., described below in FIG. 2), which can implement the example modular flight command by performing actions, and controlling included motors, rotors, wing flaps, and so on, to result in the modular flight command's safe performance. Similarly, a subsequent modular flight command can cause the UAV to descend towards the ground at the particular waypoint and capture periodic imagery of a vertical structure in a vertical line (e.g., as will be described below, with reference to FIGS. 1A-1D).

The UAV can include a system (e.g., the source determination system 200 described below in FIGS. 2-3) that determines a control source to be in control of the UAV, and enables the determined control source to provide modular flight commands to the flight control system. The system 200 can access priority information associated with control sources, and upon receiving a request for control from a particular control source (e.g., receive a modular flight command), can determine whether to enable the particular control source to assume control of the UAV. Priority information can be determined from a level of trust that is associated with an application (e.g., applications can be verified by a reviewing entity, and assigned priorities). Additionally, priority information for a particular application can be user-defined, and priority information stored for access by the UAV computer system, to indicate which applications should be in control. Additionally, priority information can be based on types of modular flight commands that each application is going to issue, for instance modular flight commands associated with navigation, or particular types of navigation (e.g., assuming direct control of the UAV and bypassing flight control loops), can be associated with higher priorities. In some implementations, each control source can have a different priority, such that a highest priority control source can always be identified. In some other implementations, control sources have can identical priority information, can upon receiving two modular flight commands from control sources with the same priority, the system 200 can provide information to a user device of an operator describing the commands, and the operator can indicate which control source is to be in control. Also the system 200, may assign one of the control sources a temporary higher priority. Furthermore, in some implementations a flight planning system that generates an overall flight plan to be implemented (e.g., the flight planning system can utilize one or more control sources acting in concert), can determine a priority to assign each control source. For instance, a user of the flight planning system can indicate that a first control source is to be associated with navigating to waypoints, and that a second control source is to provide limited navigational control and activate sensors of the UAV. The flight planning system can then determine that the first control source enables the UAV to actually move through the flight plan, and should be therefore be assigned a higher priority. Similarly, the flight planning system can obtain information describing functionality that a control source can perform, including whether it can detect contingencies (e.g., to alert a contingency handler), whether it includes logic to update its flight plan based on contingencies (e.g., described below in FIG. 5), and so on. The flight planning system can determine whether control sources specified by the user include enough logic and functionality to implement a safe flight plan, and can recommend control sources upon a negative determination. For instance, the flight planning system can determine that no control source is assigned to detect whether a contingency regarding heat or radiation exposure exists, and can cause a control source to be included for execution in a UAV implementing the flight plan that can handle the contingency.

As an example of priority information, a control source associated with handling contingencies can have a highest priority, ensuring that any determined contingency which may negatively affect the UAV's flight can be timely handled. As will be described, contingencies can include the UAV traveling outside of an approved geofence (e.g., the UAV traveling outside of an approved real-world geographic area or volume of space), a fuel level (e.g., battery charge) of the UAV being below a threshold, the UAV losing a datalink connection, the UAV losing a GNSS (e.g., GPS) signal, the UAV being in danger of colliding with terrain, the UAV being on a collision course with another UAV, and so on. In this way, the UAV can ensure that all detected contingencies are timely handled, such that an operator can assume direct control of the UAV (e.g., provide direct flying instructions), and regardless of the operator's actions, the UAV can handle any determined contingencies (e.g., the operator can aim the UAV at the ground, and upon determining upcoming terrain, the UAV can handle the contingency to right the UAV).

As described above, multiple applications (e.g., control sources) can operate in concert, for example, a first application may be associated with navigating the UAV along a flight plan (e.g., traveling to waypoints along a flight path, ascending/descending at particular waypoints, and so on), and a second application can be associated with other tasks, such as activating particular sensors (e.g., acting sensors in a defined, controlled, manner which can depend on a speed of the UAV, an altitude, a location, environmental factors such as determining that radiation levels are greater than a threshold, or any user-defined method or process). Each of the first and second applications can be associated with priority information, such that the UAV can determine which application is to be in control, for instance the second application can have a lower priority. However, in some scenarios, the UAV might be traveling along a flight plan and under control by the first application, and the second application might want to take control to capture imagery while traveling.

In some implementations, the second application can request control of the sensors (e.g., payload modules), and the UAV can determine that the requested control will not interfere with control by the first application (e.g., modular flight commands from the second application will only take control of sensors). The UAV can then enable control of sensors by the second application, allowing modular flight commands provided the first application (e.g., navigational commands) to be implemented in parallel with modular flight commands provided from the second application (e.g., sensor control, control of gimbals in communication with sensors, and so on). Parallel implementation of modular flight commands is described further below, with respect to FIG. 2. Additionally, in some scenarios, the UAV might be traveling along a flight plan and under control by the first application, and the second application might want to take navigational control. For instance, the first application can cause the UAV to ascend from the ground to a particular altitude, and the second application can cause the UAV to capture imagery during the ascent. If the second application determines that a camera failed to take an image, or that more detailed imagery is required and the UAV should move laterally towards an object being imaged, the second application can request navigational control of the UAV (e.g., by providing a modular flight command). Since the second application is associated with a lower priority, the UAV will in general reject the second application from taking control of the UAV. In this instance, in some implementations the second application can directly provide the modular flight command to the first application for approval, and the first application can determine to cause the implementation of the modular flight command. Similarly, the second application can provide the modular flight command to the UAV, and the UAV can provide the modular flight command to the first application for approval. The first application, or UAV, can cause the second application to assume control and can optionally place limits on the control by the second application. For instance, the second application can be limited to a threshold period of time (e.g., 2 minutes) to be in control, or the second application can be limited to an amount of control, including limited movement (e.g., distance traveled along one or more axes) that the second application can cause, limited speed, limited altitude, and so on.

Optionally, control sources can cause (e.g., trigger) the UAV to be placed in a particular mode (e.g., a flight mode, a navigation mode, inspection mode), with the mode enabling the UAV to accept modular flight commands from a particular control source and reject other modular flight commands (e.g., from all other control sources, or from control sources associated with issuing particular types of modular flight commands). For instance, a particular control source can provide (e.g., issue) modular flight commands associated with the UAV navigating to a particular waypoint. When the particular control source causes the UAV to navigate to the particular waypoint, the UAV can enter a particular mode (e.g., a navigation mode), such that modular flight commands from other control sources associated with navigation can be filtered, or denied. Similarly, when the UAV enters the particular mode, all modular flight commands from other control sources can be denied, or all modular flight commands not associated with navigation can be denied (e.g., commands to activate sensors). As an example, when the UAV is navigating to the particular waypoint under control by the particular control source, the UAV can be navigating over geographic areas in which the UAV is not approved to capture imagery (e.g., due to privacy limitations or concerns), and the UAV can enter a mode to only accept navigation modular flight commands, or modular flight commands from the particular control source. The particular control source can, optionally, be assigned a higher priority by the system, or can request a higher priority when causing the UAV to enter the particular mode, which the system can approve or deny. The particular control source can be associated with the higher priority until satisfaction of particular information, including the UAV performing particular functionality, leaving the particular mode, a threshold amount of time passing, and so on. In this way, the system can discard modular flight commands from other control sources. Optionally, when in the particular mode, a contingency handler can take control of the UAV upon determining a contingency exists.

Optionally when the UAV begins a flight plan, each control source that will be, or could be, vying for control of the UAV can perform an initial registration process with the UAV. During the initial registration process, the UAV can obtain priority information associated with each control source, and when the UAV enters a particular mode, associated with a particular control source, the UAV can provide information to all other control sources, or to control sources with priority information less than the particular control source, identifying that that the UAV is not accepting modular flight commands. Similarly, the UAV can update control sources when the UAV is leaving the particular mode.

The UAV can filter modular flight commands according to configuration information, such as indicating capabilities, of the UAV (e.g., whether the UAV is fixed-wing aircraft or multi-rotor copter), or a level of the trust that is associated with a particular application program. In this specification, configuration information includes any information that specifies, indicates, or is other associated with, hardware, modules (e.g., payload modules such as sensors, flight critical modules, such as hardware or software), software (e.g., software versions), included in, or that compose or comprise (e.g., an airframe type), a UAV. For instance, the UAV can filter a modular flight command that includes a parameter to ascend to greater than a maximum altitude the UAV can safely travel at, or travel at greater than a particular airspeed. Similarly, the UAV can filter a modular flight command that would cause the UAV to travel farther than a battery, or fuel, capacity of the UAV would allow (e.g., the UAV can determine that traveling to a waypoint, and subsequently to a safe landing location, would result in the UAV having battery, or fuel, below a threshold, which can be based on a direction of wind, airspeed, estimated fuel consumption, and so on). Furthermore, an application program can be associated with a level of trust designated by a reviewing entity (e.g., an entity that maintains application programs in an electronic application store). Particular modular flight commands can be associated with levels of trust greater than a threshold, such that an application program that has not gone through an appropriate vetting process can be safely implemented by the UAV, as long as the application program does not utilize particular modular flight commands. For instance, a particular application program can be associated with a level of trust that limits modular flight commands to actions associated with payload modules, such as cameras, sensors, and so on, and excludes modular flight commands associated with movement of the UAV.

In addition to filtering, the UAV can discard modular flight commands from a control source, which if implemented, can result in an undue burden on the UAV, such as by the control source erroneously providing a same modular flight command repeatedly (e.g., due to an error, or bug in the control source). The UAV can detect a number of times the modular flight command has been received, and can discard the modular flight command after the number is greater than a threshold (e.g., 1, 2, 3), or the UAV can discard all modular flight commands from the control source. If the control source is associated with navigating the UAV along a flight plan, a contingency handler can determine that the control source is unsafe or faulty, and can cause the UAV to navigate to a safe landing location. The UAV may log the received modular flight commands in a log, or one or more flight logs, so that later diagnostic analysis may be performed to determine the problem with the control source.

In this specification, UAVs include any unmanned aerial vehicles, such as drones, unpiloted aerial vehicles, remotely piloted aircraft, unmanned aircraft systems, any aircraft covered under Circular 328 AN/190 classified by the International Civil Aviation Organization, and so on. For example, various types of UAVs may be used to implement the inventions described herein (for example, a fixed wing airplane, helicopter, a multi-rotor vehicle (e.g., a quadcopter in single propeller and coaxial configurations), a vertical take-off and landing vehicle, lighter than air aircraft). A multi-rotor vehicle in a coaxial configuration may use the same propeller pitch and diameter propellers, use different pitch and diameter propellers, or variable pitch propellers. In addition, certain aspects of the disclosure can be utilized with other types of unmanned vehicles (e.g., wheeled, tracked, and/or water vehicles). For instance, a ground-based unmanned vehicle can utilize the systems described below and implement the methods and processes described in FIGS. 1-6 below.

FIGS. 1A-1D illustrate an example of a UAV performing an inspection for damage of a vertical structure. As will be described, the UAV can follow modular flight commands of a first control source (e.g., application program associated with vertical inspections), and when a contingency is determined (e.g., FIG. 1C), the UAV can handle the contingency and subsequently return control to the first control source (e.g., FIG. 1D).

FIG. 1A illustrates an example diagram of a UAV 10 implementing one or more initial modular flight commands. As described above, application program can be created, and optionally maintained in an electronic application store, with the application program associated with performing a specific task or enabling specific functionality. As illustrated in FIG. 1A, the UAV 10 is implementing initial modular flight commands from a first control source, which can be an application that enables the UAV 10 to perform an inspection of the vertical structure 20.

The first control source describes a flight plan to perform an inspection of the vertical structure 20, and as illustrated, includes waypoints for the UAV 10 to travel to (e.g., waypoints 14A-14F), for example location on a perimeter 2), and a safe altitude 30 for the UAV to ascend to (e.g., an altitude at which the UAV 10 can safely travel free of obstructions). An operator 12 is located adjacent to the vertical structure 20, and can utilize a user device (e.g., a laptop, a tablet, a wearable device) that is in communication (e.g., wireless or wired communication) with the UAV 10.

Prior to the UAV 10 ascending, the operator 12 can provide parameters associated with the flight plan, which the first control source can receive for use in implementing the inspection of the vertical structure 20. For instance, the operator 12 can interact with the user device to assign waypoints surrounding the vertical structure 20, with each waypoint indicating a vertical location the UAV 10 is to ascend/descend in a vertical line at and capture imagery. The operator 12 can, in some implementations, view geo-rectified imagery (e.g., satellite imagery) and select locations surrounding the vertical structure 20 as being waypoints. Additionally, the operator 12 can physically move to each waypoint, and obtain GNSS location information (e.g., GPS coordinates) at the waypoint. The operator 12 can designate the safe altitude 30, and other parameters including a centroid of the vertical structure 30 (e.g., the centroid can be used by the UAV 10 to ensure that the UAV 10 captures imagery in a direction of the centroid), a frequency at which the UAV 10 is to capture imagery during the inspection, a speed the UAV 10 is to travel between waypoints, a speed of descent of the UAV 10, a geofence the UAV 10 is to enforce (a real-world geographic area or volume the UAV 10 is to remain within), and so on. After the operator 30 provides parameters associated with the flight plan, the first control source can receive the parameters and utilize the parameters to effect the inspection of the vertical structure 30 (e.g., generate a flight plan).

As illustrated, the UAV 10 has determined that the first control source is to be in control of the UAV 10, and is implementing initial modular flight commands to travel to an initial waypoint 14A. As will be described, an included source determination system 200 can enable the first control source to be in control of the UAV 10. The initial modular flight commands are associated with actions for the UAV 10 to ascend to the safe altitude 30, and travel at the safe altitude 30 to the initial waypoint 14A. As will be described, the initial modular flight commands can be implemented by a flight control system 220 of the UAV 10, and upon completion of the initial modular flight commands, the flight control system can provide information to the first control source indicating successful completion of the commands. Subsequently, the first control source can provide subsequent modular flight commands to proceed with the inspection of the vertical structure 30 (e.g., described in FIG. 1B).

To effect the UAV 10 traveling to the initial waypoint 14A, a first modular flight command can be associated with take-off, and can include parameters related to a location at which the UAV 10 can take-off (e.g., GNSS coordinates), along with an indication of the safe altitude 30 to ascend to. After ascending, a subsequent modular flight command can be provided from the first control source to travel to the waypoint 14A at the safe altitude 30. Furthermore, the subsequent modular flight command can include an indication of a velocity at which the UAV 10 is to travel.

In some implementations, modular flight commands can include one or more of the following commands, with a non-exhaustive list including:

TRACK_TO_POINT: travel along a straight line toward a specified location and altitude.

HOLD_AT_POINT: hold station (e.g., hover) at a specified location and altitude.

TAKEOFF: launch the UAV from a specified location and climb to a specified altitude.

LAND: land the UAV at a specified location.

ATTITUDE_AIRSPEED: fly at a specified attitude (pitch, roll, heading) and airspeed.

VELOCITY_NED: fly at a specified 3-dimensional velocity given in a fixed coordinate frame (e.g., Earth).

VELOCITY_BODY: fly at a specified 3-dimensional velocity given in a coordinate frame of the UAV.

FLIGHT_SURFACE: set the positions of the flight control surfaces directly.

INSPECT_STRUCTURE: hold in position, and trigger sensor to obtain sensor data.

Furthermore, each of the above modular flight commands can be packaged together to describe more complex functionality. For instance, the first control source can provide a single initial modular flight command that causes the UAV 10 to ascend to the safe altitude, and travel at the safe altitude to the initial waypoint 14A. The single modular flight command can therefore, as an example, include parameters identifying the safe altitude 30 and location information (e.g., GNSS coordinates) of the initial waypoint 14A. The flight control system can include information that describes these complex modular flight commands, enabling complex application programs to be quickly created.

Additionally, modular flight commands may provide qualifiers as to when or whether the modular flight command is to be implemented. As an example of the INSPECT_STRUCTURE modular flight command, a conditional qualifier may be provided with the command, such as a parameter of "6 m." This modular flight command may be acted upon, only upon determining that the UAV is within 6 meters of the vertical structure 20. If the UAV fails to travel within 6 meters of the structure, then the modular flight command may not be performed, and could time out, and lapse if not performed within a certain time period. Alternatively, if the UAV is already within 6 meters of the structure, then the command may be performed.

Figure 1B:
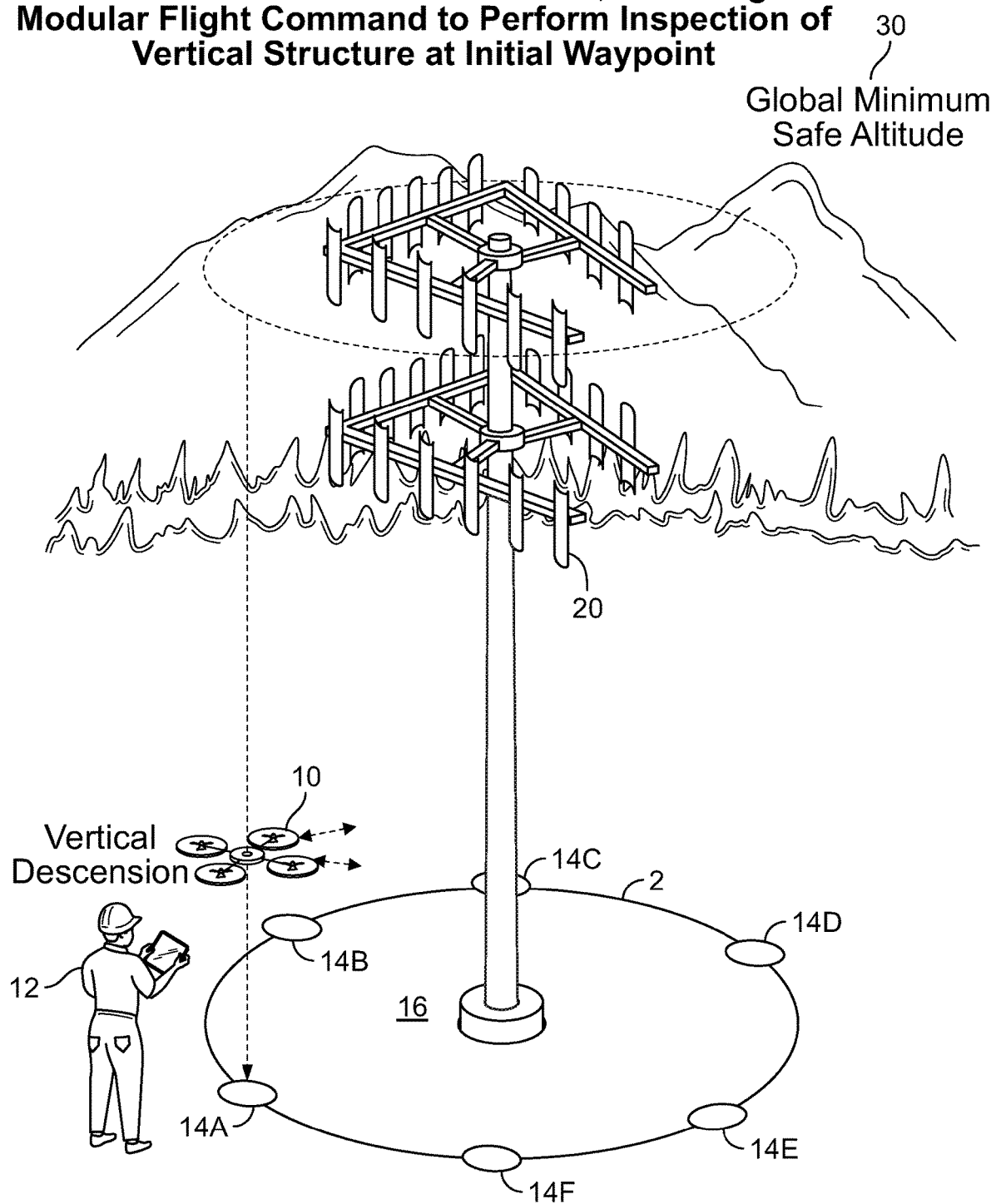
FIG. 1B is an example diagram of the UAV performing an inspection of a vertical structure along a vertical direction at an initial waypoint.

FIG. 1B is an example diagram of the UAV 10 performing an inspection of the vertical structure 30 along a vertical direction at the initial waypoint 14A. After reaching the initial waypoint 14A at the safe altitude 30, the UAV 10 implements subsequent modular flight commands to descend along a vertical line towards a surface (e.g., the ground) at the initial waypoint 14A.

As described above, one or more modular flight commands can include an indication of a frequency the UAV 10 is capture imagery 16 as the UAV 10 descends. The frequency can be associated with a time interval between capturing images, or associated with a distance descended.

Additionally, as will be described, the UAV 10 can actively determine whether contingency conditions exist, and upon a positive determination, control of the UAV 10 can be provided to a contingency handler.

Figure 1C:
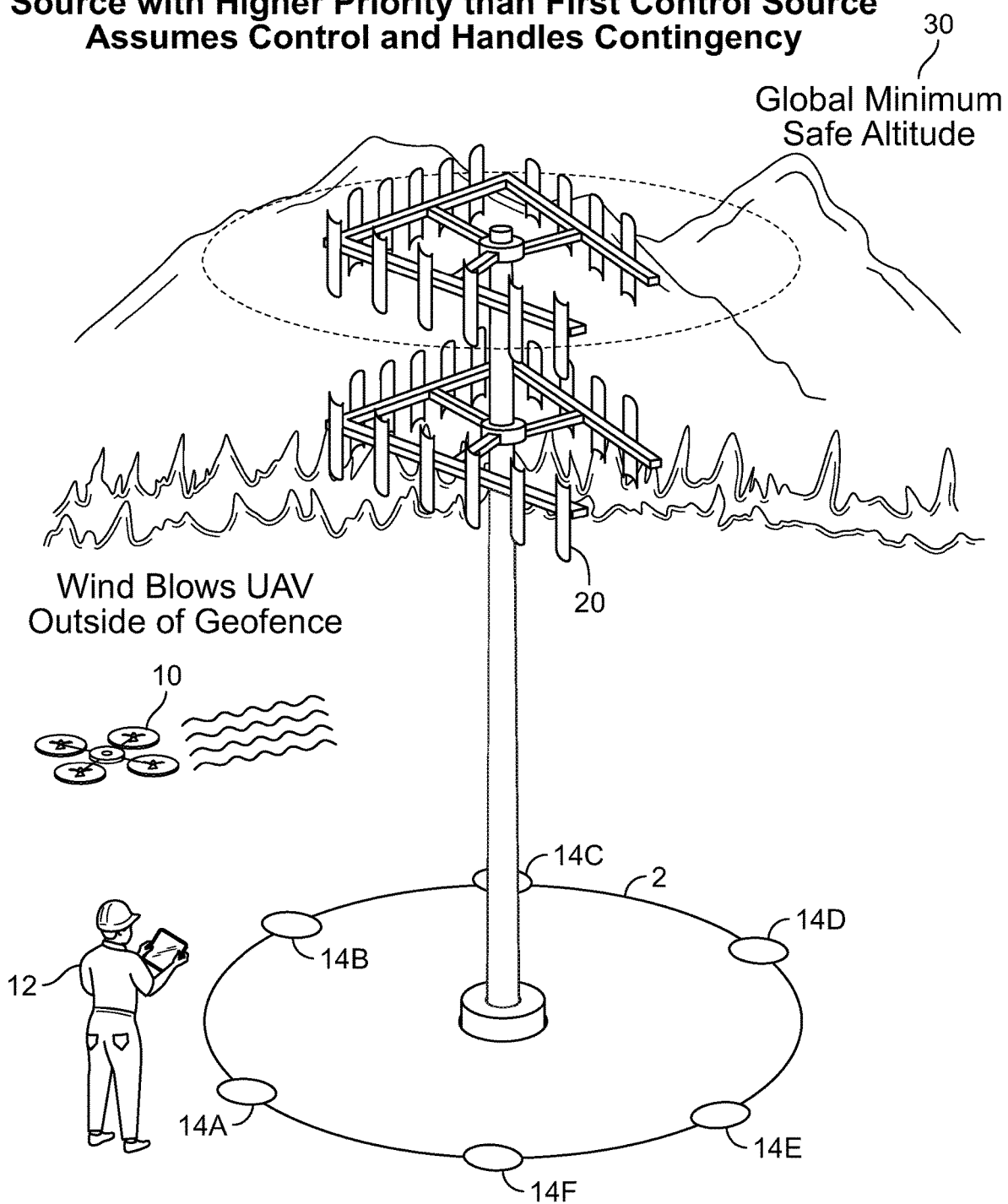
FIG. 1C is an example diagram of the UAV handling a determined contingency.

FIG. 1C is an example diagram of the UAV 10 handling a determined contingency. As illustrated, the UAV 10 has determined that due to a strong wind, the UAV 10 has been moved (e.g., blown) out of a geofence the UAV 10 is enforcing. The UAV 10 can utilize sensors, such as accelerometers included in an inertial measurement unit, to determine that the UAV 10 has moved suddenly, and can confirm that the UAV 10 is located outside of the geofence using an included GNSS receiver.

The UAV 10 includes (e.g., stores) a second control source associated with handling contingencies, which can actively monitor an overall state of the UAV 10 (e.g., location, speed, rotation, proximity, fuel level, and so on), to determine whether any contingencies are existent. Upon a positive determination, the second control source can request control of the UAV 10, and the UAV 10 (e.g., the source determination system 200) can determine that the second control source is to be in control of the UAV 10. Each control source can be associated with a priority of control, and optionally the second control source can have a greater priority. Since the first control source is an application, and the second control source is associated with ensuring a safe flight of the UAV, the second control source can preferentially be associated with the higher priority. Upon a positive determination that the second control source is to be in control, the UAV can provide information to the first control source indicating a loss of control. The first control source can store information indicating a state at which it lost control (e.g., the information can identify that the first control source lost control while performing a modular flight command, as described above in FIG. 1B).

The UAV 10 therefore implements modular flight commands from the second control source to return the UAV 10 safely within the geofence. To return the UAV 10 to within the geofence, the second control source can instruct the UAV 10 to move laterally along the direction it was blown by the wind. The second control source can utilize included cameras to ensure that no obstructions exist as it moves back within the geofence (e.g., the second control source can execute, or communicate with, one or more computer vision processes that identify obstructions). Alternatively, the UAV 10 can ascend to the safe altitude 30, move back to waypoint 14A, and descend back to a location at which the UAV 10 was at prior to being moved by the wind.

In this way, the second control source can return the UAV 10 to a safe state, with the state indicating at least, a location that is known to be safe for the first control source to resume control. As described above, the second control source can instruct the UAV 10 to move laterally back to the location prior to being blown out of the geofence. The second control source can then indicate completion of handling the contingency, and the first control source can continue with the modular flight command described in FIG. 1B. Alternatively, the second control source can ascend to the safe altitude 30, and the first control source can regain control of the UAV 10. That is, the UAV 10 can travel to the initial waypoint 14A (e.g., described in FIG. 1A), and descend at the initial waypoint 14A back to a location prior to being blown by the wind (e.g., described in FIG. 1B). Optionally, the second control source can determine a closest location at which the second control source can safely give up control to the first control source, and can instruct the UAV 10 to travel to the closest location.

Optionally, the second control source can hover at the location the UAV 10 was blown to, and provide information to the operator 12 indicating that the operator 12 is to directly control the UAV 10 to safely navigate the UAV 10 back to a safe location. For instance, the second control source can assume, or actively determine, that obstructions exist around the UAV 10. The user device of the operator 12 can prompt the operator 12 to assume control of the UAV 10, and the UAV 10 can enable control by the operator 12. Additionally, the UAV 10 can hover at the location, and the operator 12 can indicate whether it is safe for the UAV 10 to move laterally, or to ascend vertically to the safe altitude 30. The second control source can then implement the operators 12 instruction.

After the second control source handles the contingency, the UAV 10 provides information to the first control source indicating that the first control source is to resume control. The first control source can then proceed with the inspection of the vertical structure 20.

Figure 1D:
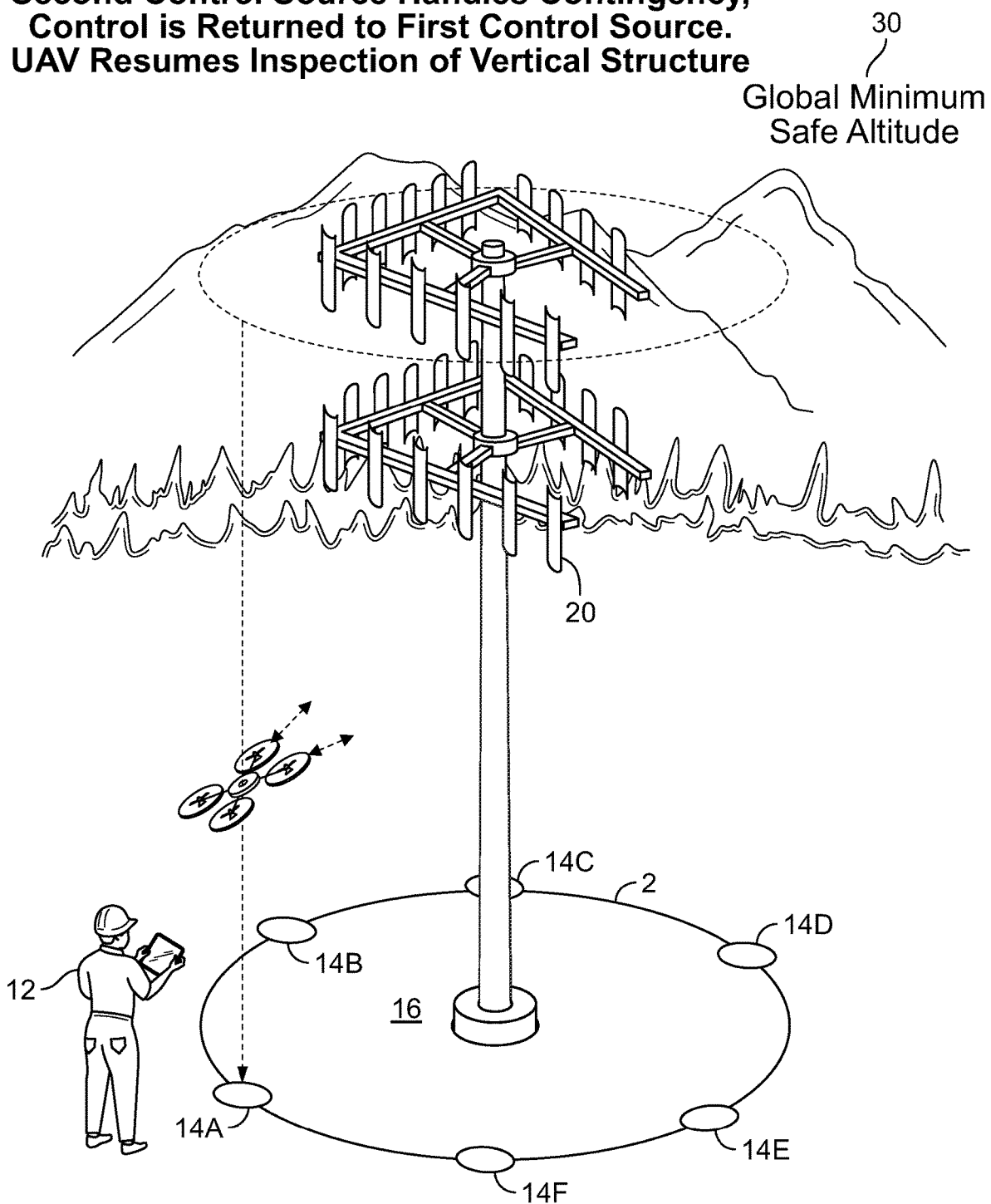
FIG. 1D illustrates an example diagram of the UAV resuming the inspection of the vertical structure.

FIG. 1D illustrates an example diagram of the UAV 10 resuming the inspection of the vertical structure 30. As described in FIG. 1C, the second control source handles the determined contingency, and the first control source regains control of the UAV 10. As illustrated, the UAV 10 has completed descending towards the surface (e.g., ground) capturing imagery, and is ascending vertically upwards at the initial waypoint 14A.

In the example, the UAV 10 is ascending back to the safe altitude 30 while tilted upwards at a particular angle (e.g., the angle can be a parameter defined by the operator 12, the angle can be a constant in the first control source, and so on) capturing imagery as the UAV 10 ascends. After reaching the safe altitude 30, the UAV can instruct the UAV 10 to travel to a subsequent waypoint (e.g., waypoint 14B), and subsequently perform an inspection at the subsequent waypoint.

The description above described an operator 12 in communication with the UAV 10, and a user device of the operator 12 can act as a control source of the UAV 10. The user device can further monitor progress of the UAV 10 as it implements a flight plan (e.g., the user device can present a user interface illustrating a map, such as satellite imagery, or digital imagery captured in a prior UAV flight, and representations of the UAV 10, a flight pattern the UAV 10 is following including one or more waypoints, actions the UAV 10 is to take at each waypoint, and so on). Furthermore, the user device can present information indicating which control source (e.g., application or device) is the control source that is presently controlling the UAV via modular flight commands. The user device can display information describing each modular flight command presently being implemented, including parameters of the modular flight command, definitional information, a result of the modular flight command (e.g., a location the UAV is traveling to), and so on. The user device can further present modular flight commands that will be implemented subsequently, and upon switching to a different control source, the user device can indicate the subsequent control source. The UAV can also provide information to the user device indicating that a particular control source has been excluded from controlling the UAV (e.g., due to an error of the control source, such as it issuing modular flight commands that have been filtered).

Figure 2:
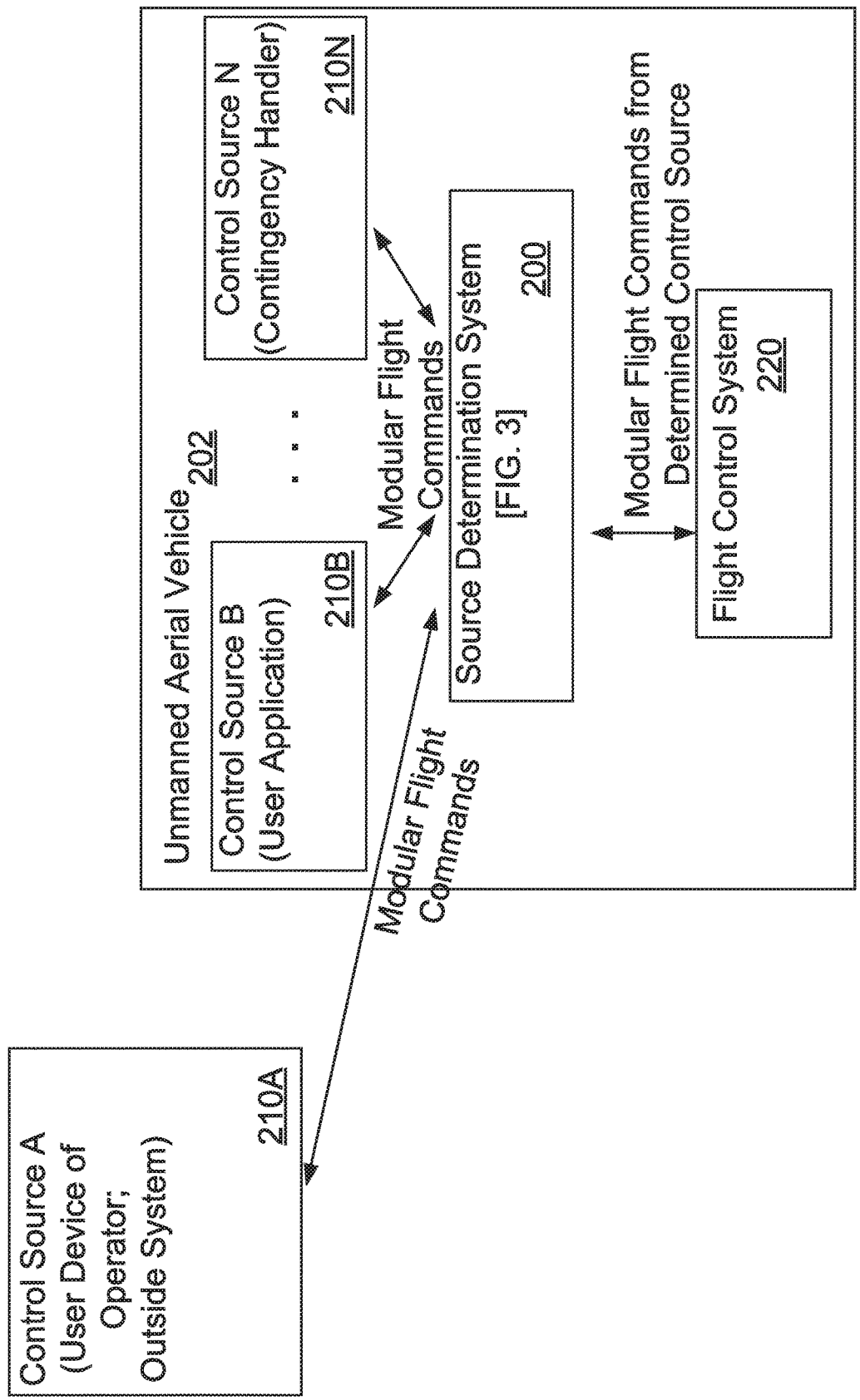
FIG. 2 is a block diagram of control sources interacting with systems of a UAV.

FIG. 2 is a block diagram of control sources interacting with systems of a UAV 202. The UAV 202 includes a source determination system 200 that can determine a control source the system 200 is in communication with, such as control sources 210A-210N, to be in control of the UAV 202, and a flight control system 220 that can implement modular flight commands of the determined control source. The source determination system 200 can be a system of one or more processors, or software executing on a system of one or more processors. The source determination system 200, flight control system 220, and control sources (e.g., control sources 210B-210N) can each be separate systems (e.g., connected by one or more data buses), or can be executed on a same system of one or more processors (e.g., separate software processes in communication with each other).

As illustrated, the UAV 202 can execute control sources (e.g., control sources 210B-210N), each of which can request control of the UAV 202, and can include application programs and one or more contingency handlers. Additionally, the UAV 202 is in communication with an outside control source (e.g., control source 210A), which can be a user device of an operator (e.g., as described above), or an outside system such as a system associated with an air traffic controller, or a system associated with dispatching UAVs to perform a task (e.g., a system can direct particular, or groups of, UAVs to be dispatched). For instance, the outside control source 210A can be a system included in a different UAV that is requesting the UAV 202 move or otherwise modify its flight plan (e.g., due to a possible collision). The outside control source 210A can also be a system associated with a governmental entity monitoring the UAV 202 during flight (e.g., an air traffic controller), which can request the UAV 202 perform a particular action (e.g., land at a particular location, modify a flight speed, and so on).

The UAV 202 includes a source determination system 200 that can receive requests from the control sources 210A-210N, and determine a particular control source to be in control at any one time. As will be described below in FIG. 3, the source determination system 200 can store, or obtain (e.g., control sources can perform an initial hand shake with the source determination system 200 to indicate priority information, for example with use of an authentication key), information identifying a priority with which each control source is associated. For instance, an application can be associated with a lower priority than a user device of an operator, or a contingency handler (e.g., as described in FIG. 1C). After determining a particular control source to be in control, the source determination system 200 can provide modular flight commands received from the particular control source to the flight control system 220 to implement. Optionally, a system associated with an air traffic controller can be associated with a highest priority (e.g., higher than a contingency handler of the UAV 202). That is, an automatic air traffic controller system can coordinate amongst multiple UAVs traveling in a same volume of space, and can cause each UAV to navigate within the space. Optionally, the air traffic controller system can request configuration information UAV 202 (e.g., flight capabilities of the UAV, such as minimum/maximum turning radius, a type of the UAV such as fixed-wing, multi-rotor, and so on), and use the configuration information to inform modular flight commands to provide the UAV 202.

The source determination system 200 can limit modular flight commands that can be implemented, for instance, while on the ground, the source determination system 200 can discard, or filter, any modular flight command that is not associated with taking off from the ground (e.g., to travel to a waypoint). For instance, the source determination system 200 can cause the UAV 202 to enter a mode associated with take-off, and can discard any modular flight command not associated with taking-off. In some implementations, a control source can request information from the source determination system 200 for a list of available modular flight commands, such that the control source can determine types of commands it can issue. Additionally, a control source may request for a particular modular flight command, the required parameters and their value ranges for the command. Therefore, when the UAV is on the ground, the system 200 can return information indicating only a take-off command can be implemented, whereas while in flight, the system 200 can return information indicating multitudes of commands. The source determination system 200 may provide a unique identifier, or handle, for a particular flight command, and the unique identifier may be returned to a requesting control source. The requesting control source then may cancel the sent flight command (if the command has not been performed), by submitting a cancel request using the unique identifier.

A particular control source (e.g., control source 210B) can be associated with handling contingencies. As described in FIG. 1C, the contingency handler can determine unsafe flight conditions, and assume control of the UAV 202 to provide correct maneuvers to restore the UAV 202 to safe flight conditions. The contingency handler can utilize information associated with the UAV 202, along with the control sources (e.g., application program) being implemented, to determine whether a contingency exists. For instance, a particular UAV (e.g., a large fixed-wing aircraft) can safely travel at a particular altitude, while a different UAV (e.g., a quadcopter with small low-power rotors) can safely travel only at lesser altitudes.

As an example of a contingency, the contingency handler can determine that the UAV 202 is outside of a geofence (e.g., as described in FIG. 1C). To handle the contingency, the contingency handler can provide modular flight commands to cause the UAV 202 to travel back within the geofence. Another example includes the UAV 202 losing a datalink connection (e.g., a communication with a user device of an operator), and the contingency handler can cause the UAV 202 to travel in a direction of the datalink, or increase an altitude of the UAV 202 until the connection is restored. Another example includes determining that the UAV 202 is in danger of colliding with terrain. For instance, the UAV 202 can store information describing terrain of a geographic area, and can compare its location (e.g., using a GNSS receiver) with the terrain information, and determine that the UAV 202 is within a threshold distance of upcoming terrain (e.g., the UAV 202 is approaching a hill). The contingency handler can cause the UAV 202 to ascend to a higher altitude in accordance with the terrain information. Another example includes determining that the UAV 202 is approaching an obstacle, which can be determined using sensors, including cameras (e.g., cameras and computer vision processes to identify obstacles), radar, sonar, distance sensors (e.g., Lidar, Leddar), and so on). To handle the contingency, the contingency handler can provide modular flight commands to take evasive maneuvers around the obstacle (e.g., around the obstacle along a same direction the UAV 202 was traveling).

Another example includes determining that the UAV 202 has exceeded a safe flight envelope, which can include exceeding an airspeed, an attitude, G-loading, angle of attack, positions of specific flight surfaces (e.g., wing flaps, spoilers), and so on. To handle the contingency, the contingency handler can take corrective actions, including returning the UAV 202 to a level flight trajectory, reducing speed, hovering, and so on. Another example includes the UAV 202 being on a collision course with another UAV. The contingency handler can detect the contingency using surveillance systems, such as Automatic Dependent Surveillance-Broadcast, which can monitor the location of multitudes of UAVs, enabling the contingency handler to actively determine whether other UAVs are approaching the UAV 202. To handle the contingency, the contingency handler can estimate the other UAVs' flight paths, and can perform evasive maneuvers to modify the UAV's 202 flight path. The UAV 202 can provide information to a user device of an operator (e.g., operator 12 as described above), and the operator can directly control the UAV 202 to change its flight path. Optionally, the user device can present a user interface illustrating a flight path of the UAV 202, and estimated flight paths of other UAVs. The operator can then modify the UAV's 202 flight path such that it does not interfere with other flight paths (e.g., greater than a threshold distance apart at any given time).

As another example of a contingency, the contingency handler can determine that the UAV 202 will be unable to complete a flight plan described by application program based on information describing a remaining fuel level (e.g., battery level, charge level of the battery, liquid fuel level). To handle the contingency, the contingency handler can obtain location information of safe landing locations (e.g., the UAV 202 can maintain locations at which the UAV 202 can safely land if necessary), and provide one or more modular flight commands for the UAV 202 to land at a nearest safe landing location. Alternatively, the contingency handler can provide information to a user device of an operator (e.g., operator 12 as described above), and the operator can provide location information identifying a safe landing location. Similarly, the operator can request direct control of the UAV 202, and safely land the UAV 202 (e.g., the operator can issue modular flight commands that can cause the UAV 202 to travel at a safe altitude and descend vertically at a waypoint associated with the safe landing location, or the operator can assume direct control of the UAV 202).

In contrast to immediately landing the UAV 202, the contingency handler, along with the application program, can determine a safe landing location that will allow the UAV 202 to safely land with greater than a threshold fuel level, and that also allows for the application program to complete as much of the flight plan as possible. For instance, the contingency handler can communicate with the application program to cause the application program to modify a described flight plan, such that the UAV 202 can return to an intended landing location (e.g., a location from which the UAV began the flight plan) while traveling to as many identified waypoints as possible. Modifying a flight plan in response to a determined contingency is described in more detail below, with respect to FIG. 5.

Optionally, applications can provide information describing contingency situations of which the contingency handler may not be aware (e.g., the contingency handler is not determining whether the contingencies are existent). For instance, a particular application can be associated with inspecting a nuclear tower cooler. A UAV implementing the inspection can be harmed if the UAV approaches a crack in the cooling tower, and radiation or extreme heat is emitted therefrom. The particular application can provide information to the contingency handler describing that if the contingency handler determines (e.g., using one or more heat sensors) that a temperature, or radiation level, is past a threshold, the contingency handler is to assume control of the UAV to navigate the UAV away from the heat source. In this way, regardless of whether the particular application is in control of the UAV (e.g., another application might be in control, for instance an application associated with traveling to waypoints which as a higher priority), the contingency handler can always assume control and handle the contingency. In some implementations, modular flight commands can be associated with different priority levels, and the particular application can provide a modular flight command indicating that a contingency situation exists. For instance, the priority associated with the particular application can be low, but the application can be allowed (e.g., verified by a reviewing entity) to provide a modular flight command associated with a maximum priority that causes the contingency handler to assume control. Other contingencies might include determining that the UAV is too close to a structure, determining that a radio signal strength is greater than a threshold, and so on.

As described in FIGS. 1A-1D, a control source that is in control of the UAV 202 can provide modular flight commands for the flight control system 220 to implement. The control source can provide a modular flight command, and the flight control system 220 can implement specific command and control of the UAV 202 (e.g., motors, rotors, wing flaps, and so on) to safely effect the modular flight command. Upon completion of the modular flight command, the flight control system 220 can provide information (e.g., a message) to the control source indicating successful completion of the modular flight command. The control source can then provide a subsequent modular flight command for the flight control system 220 to implement.

Optionally, a control source in control of the UAV 202 can interrupt a modular flight command being implemented by a flight control system 220. For instance, the control source can provide a modular flight command for the UAV 202 to descend along a vertical direction (e.g., at a particular rate of descent as described in FIG. 1B). While the UAV 202 is descending, the control source can activate one or more cameras of the UAV 202 to capture imagery during the descent. The control source can determine quality information associated with the captured imagery, and if a particular captured image is determined to not meet quality thresholds (e.g., the particular image is determined to be blurry, out of focus, not to include an intended field of view, and so on), the control source can provide modular flight commands associated with re-capturing the particular image. The flight control system 220 can then stop descending, and implement the received modular flight commands. For instance, the control source can instruct the flight control system 220 to ascend back to a location at which the particular image was captured, and then hover at the altitude. While hovering, the control source can capture one or more images, and determine whether the images are acceptable. Upon a positive determination, the control source can instruct the flight control system 220 to proceed with descending.

As an example of determining quality information, captured imagery can be analyzed to determine sharpness measurements of the captured image. For instance, a frequency domain analysis of the image can be performed, and a lack of high frequencies can be indicative of a lack of focus (e.g., compared to an expected inclusion of high frequencies for the image). Additionally, a laplacian kernel can be convolved with the image (e.g., in the spatial domain) and the result can be used to determine blurriness of the image (e.g., intensity values of pixels within a threshold distance can be compared, and a blurry image can have a lack of comparisons greater than a threshold). Additional quality information can include brightness measurements, exposure measurements, contrast measurements, and so on.

Furthermore, the control source can analyze captured images and identify a portion of an analyzed image that is to be imaged in greater detail. For example, while inspecting a vertical structure, the UAV 202 can descend along a vertical line and capture images of the vertical structure. The control source can analyze captured images for specific features (e.g., damage, or specific type of damage such as weather damage), and can instruct the flight control system 220 to move closer to the vertical structure (e.g., to obtain more detailed imagery), or to move laterally (e.g., left/right, or clockwise/counterclockwise around the vertical structure). In this way, the control source can provide modular flight commands to be implemented by the flight control system 220, while also retaining the ability to modify or cancel a provided modular flight command.

As described above, control sources 210A-210N can request control of the UAV 202, and the flight control system 220 can implement modular flight commands from a particular control source. Optionally, one or more control sources can provide commands to payload modules, such as sensors, cameras, and so on, instead of requesting control of the UAV 202. For instance, a first application can execute on the UAV 202 that includes particular waypoints at which the UAV 202 is to travel. The first application can therefore request control of the UAV 202, and provide modular flight commands to the flight control system 220 to implement. A second application can execute on the UAV 202 that provides commands to payload modules to effect specific functionality at each waypoint. For instance, the second application can capture imagery and analyze the imagery to identify damage. Upon a positive identification of damage, the second application can provide information to the first application to move towards the damage to obtain detailed imagery. In another instance, the second application can activate sensors to record a heat pattern of a nuclear cooling tower. In this way, an entity creating a flight plan can define waypoints for the UAV 202 to travel to, and can utilize different applications to perform disparate functionality at each waypoint. That is, the entity can swap out different applications to control payload modules, while retaining the application program to travel to waypoints.

Optionally, the source determination system 200 can determine that modular flight commands provided from two or more control sources can be implemented in parallel, enabling control sources with non-conflicting modular flight commands to implement functionality to be performed by the UAV. For instance, the UAV can be implementing a modular flight command associated with a particular priority, and instead of filtering, or denying, a modular flight command from a different control source with a lower priority, the system 200 can optionally implement both modular flight commands. As described above, a modular flight command associated with activating sensors, gimbals, and so on, can be implemented in parallel with modular flight commands associated with navigation, movement, and so on, of the UAV 202. To enable parallel implementation of modular flight commands from different control sources, the source determination system 200 can determine whether the modular flight commands will conflict, or otherwise interfere with implementation of each other modular flight command (e.g., implementation of a modular flight command as if it was solely being implemented). The system 200 can utilize information describing actions associated with each modular flight command, parameters associated with the modular flight commands, and so on, and can determine whether the commands conflict.

As an example, a first modular flight command from a first control source can be associated with causing the UAV 202 to ascend to a particular altitude (e.g., safe altitude 30 as described above), and a second modular flight command provided from a second control source can be associated with one or more actions to be performed by the UAV 202 that do not modify positional information of the UAV 202. The source determination system 200 can obtain information describing each modular flight command (e.g., actions that each modular flight command is associated with), and can determine that the first modular flight command is associated with the UAV 202 ascending in a substantially vertical direction (e.g., with little lateral movement). The source determination system 200 can then determine that a modular flight command, that when implemented, does not affect (e.g., or a cancelable affect when the modular flight commands are both implemented) movement along the vertical direction, or lateral directions, can be properly implemented in parallel. For instance, the second modular flight command can cause the UAV 202 to activate sensors, gimbal controls in communication with sensors, and other payload modules that do not affect a position of the UAV 202. Similarly, the second modular flight command can cause the UAV 202 to rotate about a yaw axis (e.g., the UAV 202 can ascend in a substantially vertical line while rotating about the yaw axis).

As another example, a first modular flight command can be associated with the UAV 202 hovering at a particular altitude. In this example, the source determination system 200 can determine that a different modular flight command associated with the UAV 202 rotating about the roll axis (e.g., leaning to the left or right), or rotating about the yaw axis, can be safely implemented in parallel.

In determining that modular flight commands can be implemented in parallel, the source determination system 200 can utilize configuration information of the UAV 202. For instance, a fixed-wing aircraft might not be able to ascend to a location while rotating about a yaw axis. Similarly, a particular quadcopter (e.g., or other multi-rotor configuration) might be able to ascend vertically while leaning to the left or right (e.g., a constant rotation angle about the roll axis, a constant angle orthogonal to the yaw axis), while a different quadcopter might not be able to implement the modular flight commands in parallel. For instance, the particular quadcopter might allow for propellers blades to move along one or more axes (e.g., rotate about the roll axis), such that the quadcopter can ascend in a substantially vertical direction while leaning to the left or right, while the different quadcopter might be unable to ascend vertically while leaning to the left or right. However, both the particular quadcopter and the different quadcopter might be able to ascend vertically while rotating about the yaw axis (e.g., both quadcopters can modify propeller rotation rates).

In some implementations, control sources can specify particular parameters, or other information, associated with modular flight commands indicating UAV 202 state information (e.g., location, speed, attitude information, and so on), which can be modified by one or more other modular flight commands in parallel. For instance, a first control source can provide a modular flight command associated with hovering at a particular altitude (e.g., safe altitude 30). The modular flight command can specify a particular longitude and latitude at which the UAV 202 is to hover, such that the flight control system 220, can maintain the UAV's 202 three-dimensional position. However, the modular flight command can specify that the UAV 202 cannot move below the particular altitude, but can move laterally, and optionally can ascend above the particular altitude. A second control source, for instance a control source with a lower priority than the first control source, can receive information (e.g., a message) describing the modular flight command, for instance the source determination system 200 can indicate that the second control source can implement modular flight commands associated with movement, except for movement below the particular altitude. The second control source can then provide a modular flight command associated with moving the UAV 202 (e.g., laterally), capturing imagery or other sensor information at the moved to location, and so on. As described above, the first control source can specify time-limits during which a second control source is free to perform particular actions. Similarly, the modular flight command can specify a time-limit during which a different modular flight command can be performed in parallel (e.g., the UAV 202 can move laterally, capture imagery, and if it passes a time threshold, the system 200 can cause the UAV 202 to return to the hovering location). Additionally, the modular flight command can specify that the UAV 202 can move within a threshold distance (e.g., along one or more axes) of the hovering location, enabling the second control source to provide modular flight commands that conform to the threshold movements.

Control sources can subscribe to particular state information associated with the UAV 202, including location information, attitude information, airspeed, and so on, and based on the state information can request control of the UAV 202. For instance, a first application can store location information of waypoints, and a second application can enable specific functionality at each waypoint. The first application can provide a modular flight command to the flight control system 220 to travel to a first waypoint, and when the UAV 202 reaches the first waypoint, the second application can be triggered, or the second application can monitor the location information, and can request control of the UAV 202. The second application can then hover at that location, descend vertically, move laterally, and so on, while activating one or more sensors or cameras to perform specific functionality. For example, an entity can quickly create the first application by identifying waypoints of interest on a nuclear cooling tower. The entity can obtain a second application that enables the determination of radiation, or heat, from the nuclear cooling tower (e.g., from an electronic application store), and include the second application on the UAV 202 as a control source. Therefore, the UAV 202 can follow the first application to travel to identified waypoints, and at each waypoint, the second application can perform functionality to determine whether the nuclear cooling tower is leaking radiation or heat. In this way, specific functionality can be fragmented from the simple creation of flight plans, allowing an entity to easily modify an intended use of the UAV 202.

Optionally, the first application described above can be associated with a higher priority than the second application. The first application can, for instance, take control back from the second application (e.g., interrupt the second application) if it determines that the second application has exceeded a particular time-limit (e.g., the second application has been in control for greater than a threshold amount of time). In this way, the first software can designate strict limits on the amount of time the second application is control, and can ensure that enough fuel (e.g., battery charge) exists for the entirety of the waypoints to be traveled to.

In addition to subscribing to state information, a first control source can specify (e.g., specify to the source determination system 200) one or more other control sources associated with lower priorities, which can provide modular flight commands while the first control source is in control of the UAV 202. For instance, each control source can be associated with an identifier, and the first control source can specify identifiers associated with the other control sources that can provide modular flight commands. As an example, the UAV 202 can be implementing one or more modular flight commands provided by the first control source, or the UAV 202 can have entered a mode (e.g., a navigation mode) specific to implementing modular flight commands (e.g., or a control source of a higher priority, such as a contingency handler). The one or more other control sources can then provide modular flight commands for implementation, and the system 200 can provide the modular flight commands to the flight control system 220. For instance, the first control source can be associated with traveling to waypoints, and each other control source can be associated with obtaining sensor data (e.g., different types of sensor data, such as radiation, heat, and so on). The first control source can indicate that the other control sources are to be permitted to implement modular flight commands, and can as described above, specify limits on the modular flight command. For example, the first control source can specify that the other control sources cannot take navigational control of the UAV 202, or cannot move the UAV 202 more than a threshold, or can specify an approved time for the other control sources to be able to implement modular flight commands, and so on.

Figure 3:
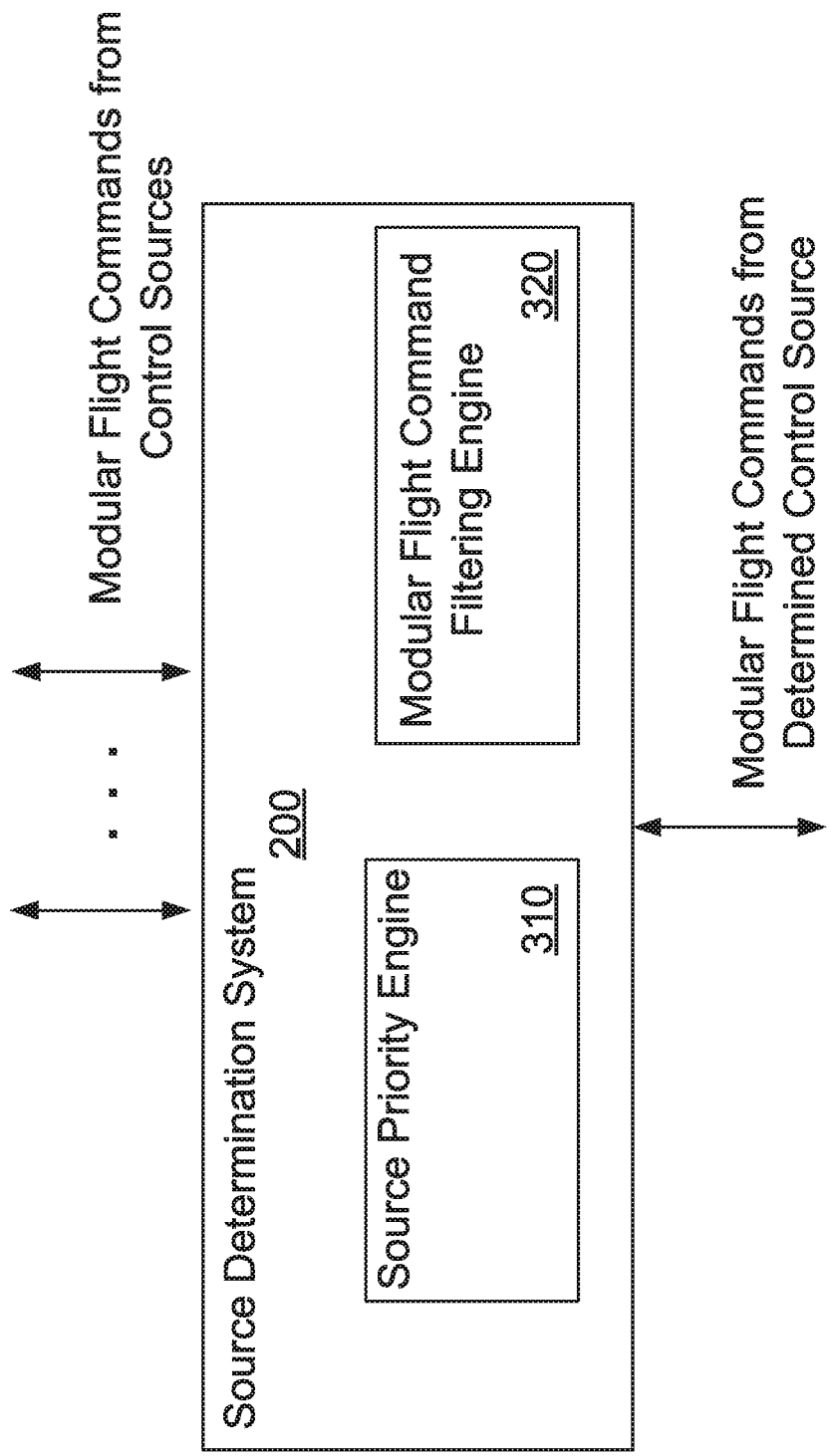
FIG. 3 is a block diagram of an example source determination system.

FIG. 3 is a block diagram of an example source determination system 200. As described above, the source determination system 200 can determine a control source that is to be in control of the UAV 202, and can optionally ensure that received modular flight commands are safe for the UAV 202 to implement.

The source determination system 200 includes a source priority engine 310 that can receive requests from one or more control sources, and can determine a particular control source to be in control. As described, each control source can be associated with a priority, and the source priority engine 310 can maintain priority information. For instance, particular control sources (e.g., applications executing on the UAV 202) can include priority information that the system 200 can identify upon initial installation or examination. Other control sources, such as control sources not executing on the UAV 202, can be required to perform an initial handshake process (e.g., provide an authentication key), such that the UAV 202 can obtain priority information. For instance, all control sources, or particular control sources as described above, can provide an indication of its priority information in a request to the source priority engine 310, which can optionally include an authentication token, a password, a signed request (e.g., signed using an authenticated encryption key), and the source priority engine 310 can assign the control source to the indicated priority. The source priority engine 310 utilizes the priority information to enable a requesting control source with a highest priority to assume control of the UAV 202. For instance, as described in FIGS. 1A-1D, application program can control the UAV 202 and implement an inspection of a vertical structure. A contingency handler can determine that a contingency exists, and request control of the UAV 202. The source priority engine 310 can receive the request from the contingency handler, determine that the contingency handler has greater priority than the application program, and enable control of the UAV 202 by the contingency handler.

Upon any switching of control from a first control source to a second control source, the source priority engine 310 can provide information to the first control source indicating a loss of control. When the second control source completes one or more modular flight commands, the source priority engine 310 can provide information to the first control source indicating that it is to be in control of the UAV 202.

Optionally, one or more control sources can determine respective priority levels to provide to the source priority engine 310, which can depend on particular state information of the UAV (e.g., location, tasks that were just completed, time, and so on), such that priorities associated with each control source can be modified during a flight. For example, the control sources, or the source priority engine 310, can determine that during an initial phase of a flight (e.g., take-off), a first control source is to be associated with a greater priority than other control sources. Subsequently, a different control source can be associated with a greater priority, for instance a control source associated with traveling to waypoints. The control sources can be in communication with each other, such that they can negotiate for particular priorities, enabling applications associated with each control source to implement complex priority handoffs that can be defined in each application. In this way, the source priority engine 310 can receive information indicating negotiated priorities, and can offload the complex priority assignment tasks to one or more control sources.

The source determination system 200 further includes a modular flight command filtering engine 320, which can modify, or discard, modular flight commands from a control source. For instance, the modular flight command filtering engine 320 can analyze a received modular flight command (e.g., analyze parameters of the modular flight command) to ensure that the modular flight command will be safe for the UAV 202 to implement (e.g., based on configuration information of the UAV 202). As an example, the modular flight command filtering engine 320 can determine that a modular flight command associating with ascending to a particular height includes a rate of ascent parameter that is too great for the specific UAV 202 to implement (e.g., based on, in some examples one or more of, an air frame type of the UAV 202, engine, propellers, motors, rotors, angles of flaps or wings, and other configuration information). The filtering engine 320 can obtain information identifying acceptable values of parameters, and determine that the modular flight command includes an out of bounds parameter. As another example, the filtering engine 320 can determine that a modular flight command associated with traveling to a waypoint (e.g., real-world location), is to be discarded because the waypoint is outside of an approved geofence the UAV 202 is to enforce. Optionally, the filtering engine 320 can modify parameters of modular flight commands so that the parameters are commensurate with capabilities of the UAV 202, and are within an acceptable range for the particular modular flight command to be performed. For instance, the filtering engine can modify a velocity so that the UAV 202 remains within a bounded velocity value. As an example, a speed of 5 meters/sec may be specified in a modular flight command, however, the source determination system may identify that the specified parameter is outside of an acceptable range. While in one embodiment, the source determination system 200 can respond to the control source that the parameter is outside of range, and return an error message to the control source, in another embodiment, the source determination system 200 can set the modular flight command parameter to the highest value, or other acceptable value. As an example, the modular flight command may provide a parameter of 5 meters/second, however, the max speed may be 3 meters/sec for the command. The source determination system may change the value of 5 meters/sec as initially requested, to 3 meters/second as allowed by the flight control system 220. Optionally, the source determination system may before performing the modular flight command indicate to the requesting control source that the parameter, has been changed, and seek approval from the control source to execute the flight command with the new parameter. Similarly, a modular flight command that causes the UAV 202 to travel at greater than a minimum turning radius of the UAV 202 (e.g., based on configuration information of the UAV 202, or actively determined based, in part, on configuration information and turning attempts actually made) can be filtered, or modified (e.g., the UAV 202 can turn at the minimum turning radius and then modify its flight path to return to a flight path as if the UAV 202 had turned at the requested turning radius).

Additionally, in some implementations, modular flight commands can be maintained in a queue, such that control sources can provide modular flight commands, and the source determination system 200 can store the modular flight commands for later implementation. For instance, while the UAV is acting upon modular flight commands of a certain priority, other commands from other control sources may be queued, and may be acted upon after the commands from the prioritized control source have been completed. The modular flight commands from the lower prioritized control source may also have a time limit to be performed. If the modular flight commands of the non-prioritized control source are not performed within a particular time limit, then the flight commands may expire, and not be performed. In other words, if a queued non-prioritized flight command is not performed on time, the flight command may not be performed at all. Additionally, a control source issuing modular flight commands that are filtered by the modular flight command filtering engine 320 (e.g., a number of modular flight commands greater than a threshold, such as 0, 1, 5), can be blocked from assuming control of the UAV, and all modular flight commands of the control source that have been queued can be discarded.

The modular flight commands included in the queue can be reordered from their initial position in the queue, and/or grouped together. For example, the UAV can be at a waypoint, and a control source can provide modular flight commands to perform an initial inspection (e.g., obtain sensor information) at the waypoint. During the initial inspection, a different control source with a higher priority might cause the UAV to move from the waypoint. The queue might include modular flight commands associated with the inspection, which have yet to be implemented. Once the UAV is moved to a new location, optionally the control source can perform an inspection at the new location. The system can modify the queue to place the modular flight commands associated with the initial inspection later in the queue, such that after inspecting the new location, the UAV can travel to the waypoint and resume inspection. Additionally, modular flight commands can be grouped together such that modular flight commands can be opportunistically performed when appropriate. For example, while at the waypoint, two or more control sources can provide modular flight commands associated with obtaining different types of sensor information. These modular flight commands can be grouped together, such that if one modular flight command is moved to a different position in the queue, all of the grouped modular flight commands can be moved. Since each is associated with similar functionality (e.g., obtaining sensor information using respective disparate sensors), each modular flight command can be maintained together.

The modular flight command filtering engine 320 can further ensure that control sources providing modular flight commands are associated with a level of trust necessary for each modular flight command to be implemented. Control sources, such as application program, can be validated by a reviewing entity (e.g., an entity that maintains an electronic application store that includes application program), and the reviewing entity can assign a level of trust to the application program. The filtering engine 320 can obtain an indication of a level of trust for each modular flight command, and can filter modular flight commands that exceed the level of trust. For instance, a modular flight command can be associated with directly controlling the UAV 202, that is, a command that directly modifies flight surfaces (e.g., wing flaps) and bypasses the flight control system's 220 control of the UAV 202. Since this modular flight command requires considerable experience with controlling UAV's, the level of trust must be high. Furthermore, even for a control source that can control flight surfaces, the modular flight command filtering engine 320 can discard modular flight commands upon determining that particular state information of the UAV is not true. For instance, the engine 320 might only allow a control source to implement flight surface modifications if the UAV is above a particular altitude, and if not, the engine 320 can provide information to the control source indicating that the state information does not meet guidelines, thresholds, and so on. In this way, the engine 320 can restrict control sources from implementing modular flight commands that do not meet defined operational conditions (e.g., user-defined conditions), and therefore control sources that are third-party generated applications can be reined in, and modular flight commands blocked that do not meet the conditions (e.g., altitude, location, speed, and so on).

Additionally, specific modular flight commands can be associated with particular modes of navigation. For instance, a particular mode of navigation can include traveling to waypoints, and when the UAV is placed in the particular mode, only modular flight commands associated with traveling to waypoints will be allowed by the filtering engine 320. Another example particular mode can include performing an inspection of a vertical structure, and when placed in the mode, the modular flight commands associated with traveling to waypoints, descending, ascending, and so on, can be accepted by the filtering engine 320.

Additionally, the level of trust can further indicate acceptable parameter ranges of modular flight commands. For instance, an application associated with a first level of trust can provide a modular flight command for the UAV 202 to travel a threshold distance to a waypoint. Similarly, the filtering engine 320 can allow an application associated with a second level of trust to cause the UAV 202 to only travel shorter distances. As described above in FIG. 2, a first application can be associated with a flight plan to travel to waypoints, and a second application can be associated with performing specific functionality. The filtering engine 320 can therefore filter modular flight commands from the second application that would cause the UAV 202 to move greater than a threshold distance. In this way, the second application can be limited to very specific short maneuvers (e.g., moving laterally to the left to capture an image, and so on). If the second application requests movement further than the threshold, the filtering engine 320 can provide the modular flight command to the first application, or user device of an operator, for approval.

Figure 4:
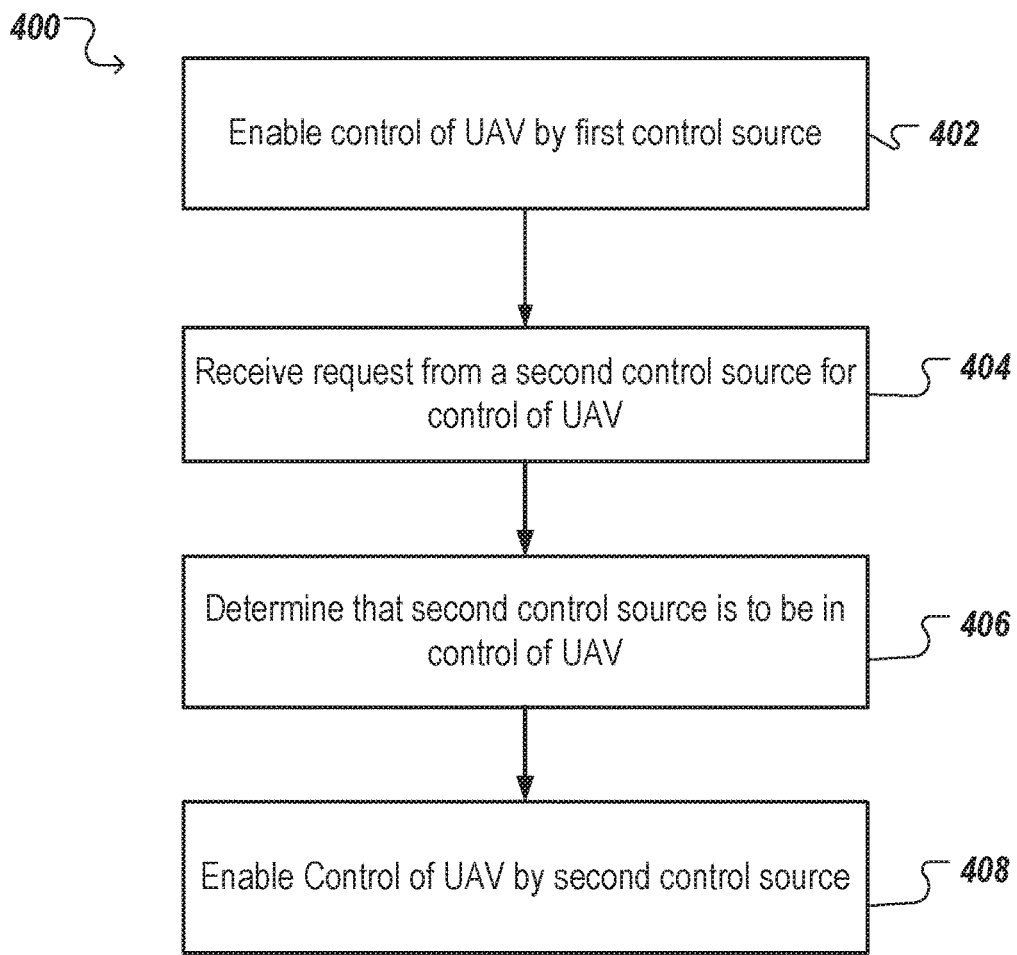
FIG. 4 is a flowchart of an example process for enabling control of a UAV by one or more control sources.

FIG. 4 is a flowchart of an example process 400 for enabling control of a UAV by one or more control sources. For convenience, the process 400 will be described as being performed by a system of one or more processors (e.g., the unmanned aerial vehicle 202).

The system enables control of a UAV by a first control source (block 402). As described above, a UAV computer system can execute one or more applications to perform a flight plan. The first control source can request control of the UAV, such as by providing a modular flight command to the system, and the system can determine that the first control source is to be in control.

The system receives a request from a second control source for control of the UAV (block 404). While the first control source is in control of the UAV (e.g., the first controls source provides modular flight commands for implementation), a second control source can provide a request for control to the system, and the system can determine (e.g., select) a control source with a highest priority. For instance, the second control source can be a contingency handler, a user device of an operator, a system associated with a regulatory agency, and the system can receive the request.

The system determines that the second control source is to be in control of the UAV (block 406). The system obtains priority information associated with the first control source and the second control source, and determines that the second control source is associated with a higher priority.

The system enables control of the UAV by the second control source (block 408). The system interrupts control by the first control source, and enables the second control source to provide modular flight commands for implementation. For instance, the system can provide information (e.g., a response) to the second control source indicating that it can assume control (e.g., issue modular flight commands). As described above, the system can provide information to the first control source indicating a loss of control, and the first control source can store information identifying a state of a flight plan being implemented at which it lost control. For instance, as described in FIG. 1C, the first control source can store information identifying a location at which it lost control, or a state in a state diagram described the flight plan, so that the first control source can later resume the flight plan.

The second control source provides modular flight commands (e.g., to handle a contingency), and upon completion of the modular flight commands, the system provides information to the first control source indicating that the first control source can resume control.

As described above, the system can filter modular flight commands based on determining that parameters of the modular flight command would cause the UAV to enter a contingency, or would otherwise be burdensome on the UAV, or that the UAV is not in a mode such that the modular flight command can be implemented. Prior to implementing any modular flight command, the system can verify that the modular flight command is allowed to be implemented (e.g., if the UAV is on the ground, any modular flight command other than a command associated with a take-off can be discarded).

Figure 5:
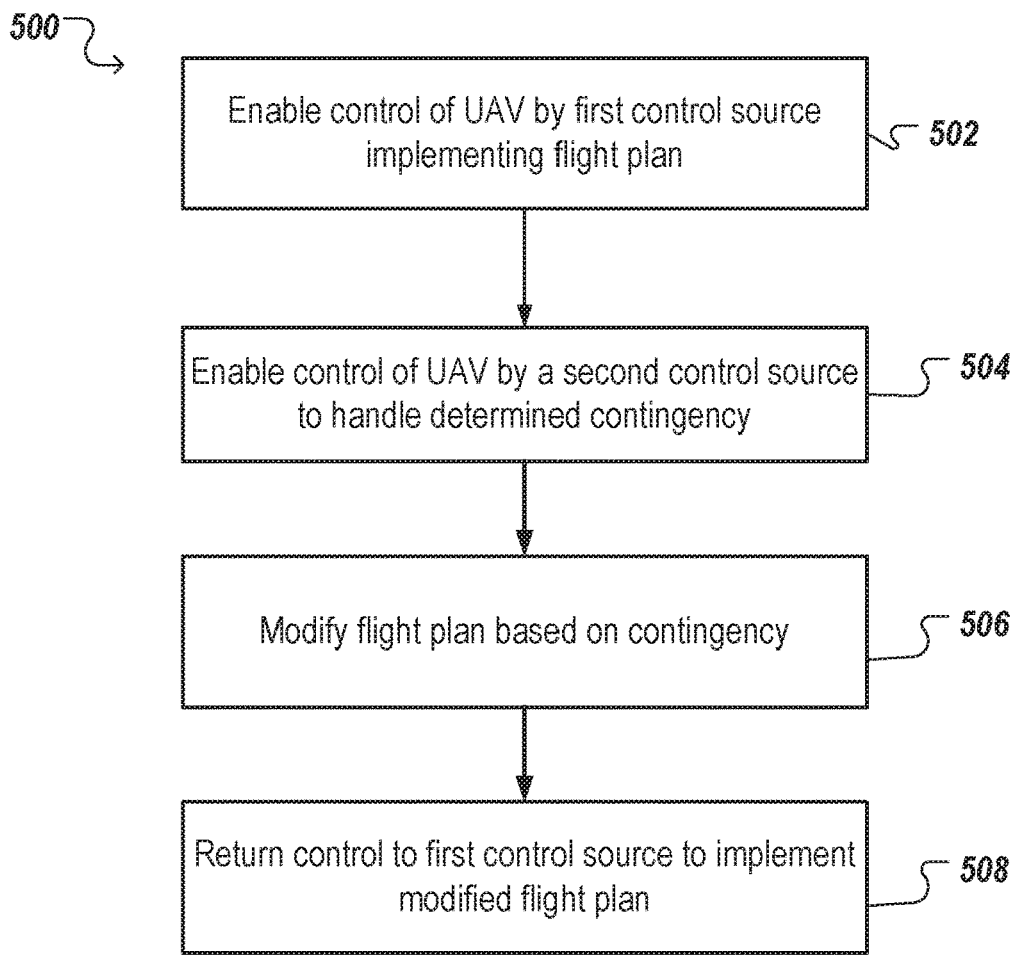
FIG. 5 is a flowchart of an example process for modifying a flight plan of a UAV based on a determined contingency.

FIG. 5 is a flowchart of an example process 500 for modifying a flight plan of a UAV based on a determined contingency. For convenience, the process 500 will be described as being performed by a system of one or more processors (the UAV 202).

The system enables control of the UAV by a first control source implementing a flight plan (block 502). As described above, application program can implement a flight plan describing one or more waypoints (e.g., geospatial locations) at which the UAV is to navigate between. The application program can include specific actions the UAV is to take at each waypoint, including activating particular sensors, cameras, and optionally specific actions the UAV is to take while navigating between waypoints.

The system enables control of the UAV by a second control source to handle a determined contingency (block 504). A second control source configured to detect and handle contingencies, determines that a contingency exists and requests control of the UAV. The system determines that priority information associated with the second control source is greater than the first control source, and enables the second control source to assume control. As will be described, the flight plan being implemented by the first control source can be subsequently modified according to the specific contingency determined. An example of a contingency includes the UAV determining that it lacks sufficient fuel (e.g., battery charge, liquid fuel level) to navigate to each waypoint and return to a landing location. An additional example includes the UAV identifying a failure of a module, such as a camera, sensor, and so on.

The system modifies the flight plan based on the determined contingency (block 506). As described above, an example contingency is that the UAV lacks sufficient fuel to navigate to each waypoint. The second control source can monitor fuel levels, and using information describing the flight plan, can estimate whether the UAV can complete the flight plan and safely land with greater than a threshold fuel level. The second control source can utilize information describing a direction of wind along a flight path of the flight plan, and utilize the wind information to inform a rate at which fuel will be depleted along the flight path. The second control source can therefore determine whether the UAV is likely to be able to navigate to each waypoint (e.g., and take additional actions at each waypoint such as descending in a vertical line, hovering at the waypoint, and so on).

The second control source can provide information to the first control source indicating that the flight plan will not be completed. Optionally, the second control source can request that the first control source select a threshold number of waypoints to be navigated to, and then verify that the UAV can safely navigate to each waypoint and travel to a landing location. That is, the first control source can select (e.g., based on ranking information of waypoints) the threshold number of waypoints and provide location information associated with each waypoint to the second control source for verification. Optionally, the second control source can request that the first control source select a threshold number of waypoints, and specify a maximum range from the landing location at which any waypoint can be located. Optionally, the second control source can provide the information describing a direction of wind, along with a determined rate at which fuel will be depleted along the flight path, to the first control source, and the first control source can determine waypoints to be navigated to. The second control source can then verify that the UAV can travel to each waypoint and land at landing location with greater than a threshold fuel level.

Another example contingency can be associated with an included module, such as a sensor or camera, failing. If the second control source determines that the flight plan can safely proceed with the failure (e.g., the module is not flight critical), the second control source can provide information to the first control source indicating the failure. Since the first control source might rely on the module to perform specific functionality, such as obtain radiation measurements, heat measurements, capture images, the first control source can respond that the flight plan is to be canceled.

Alternatively, the first control source can indicate that the flight plan can still proceed, but the flight plan is to be modified. For instance, the first control source can modify the flight plan to use a different module (e.g., a different camera with a lower resolution sensor), and the flight plan can be updated in accordance with the different module (e.g., the flight plan can be updated to move the different camera closer to an object, structure, being imaged to capture images with a same number of pixels per distance as the failed camera). In another example, the first control source can provide information to a user device of an operator indicating the module's failure, and provide a recommendation that a different module be utilized to perform different functionality. For instance, if the flight plan was to determine radiation from a nuclear cooling tower, and the radiation sensor fails, if the UAV includes a heat sensor, the first control source can recommend that alternatively the UAV determine heat information of the nuclear cooling tower. Upon a positive indication by the operator, the first control source can modify the flight plan to utilize the heat sensor. Since the heat sensor might require additional modifications to the flight plan, such as an updated flight pattern, updated actions to take at waypoints (e.g., the heat sensor might require the UAV to move in a prescribed manner), optionally the first control source can request (e.g., from the operator), information describing a manner of using the heat sensor. That is, optionally the operator can provide (e.g., wirelessly provide) executable code associated with an application to utilize the heat sensor, which the UAV can receive and implement.

The system returns control to the first control source to implement the modified flight plan (block 508). After the flight plan is modified, the first control source can regain control of the UAV from the second control source, and implement the modified flight plan.

Figure 6:
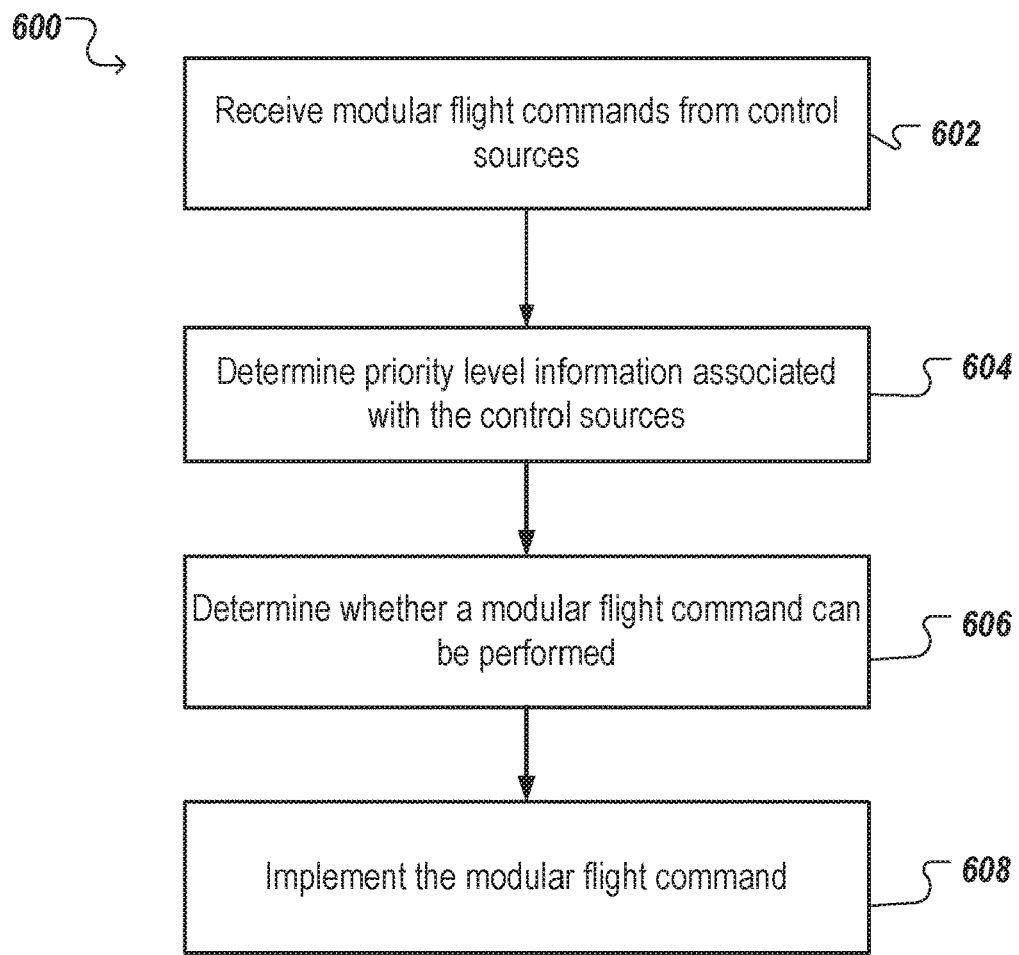
FIG. 6 is a flowchart of an example process for implementing a modular flight command evaluation process.

FIG. 6 is a flowchart of an example process 600 for implementing a modular flight command evaluation process. For convenience, the process 600 will be described as being performed by a system of one or more computers (e.g., the UAV 202). The process 600 can be maintained as executable code for execution by a system, such as a flight command evaluation module.

The system receives modular flight commands from one or more control sources (block 602). As described above, the system, for instance the source determination system 200, can be in communication with one or more control sources that can provide modular flight commands for implementation. For instance, a control source can subscribe to state information associated with the UAV, such as a location of the UAV, a speed of the UAV, an altitude, a present time, and so on. The control source can determine that, based on a present location and altitude of the UAV, that it is to provide a modular flight command to be implemented by the UAV (e.g., the UAV is to capture imagery, the UAV is to descend at a controlled rate at the location towards the ground, and so on). Additionally, a control source can issue a modular flight command upon receiving information from the system indicating successful completion of a prior issued modular flight command, or a completion of a modular flight command issued from a different control source. For instance, a particular control source can receive information from the system, or from a different control source, indicating that a modular flight command issued by the different control source has completed, and the particular control source can provide a modular flight command.

The system determines priority level information associated with the control sources (block 604). As described above, each control source can be associated with a priority level, which can be predetermined prior to flight of the UAV (e.g., a user can order, and otherwise assign priorities, to applications, to a user device, and so on), by a reviewing entity (e.g., the reviewing entity can specify a level-of-trust), or can be based on modular flight commands the control source is to issue (e.g., an application with navigational control can be assigned higher than an application that controls payload sensor modules). As described above, the system can register with each control source, and during the registering process the control source can specify a priority level (e.g., the control source can provide an authenticated token, or password, to authenticate that the priority level is correct). Additionally, the system can receive priority information with a first modular flight command received from each control source, or with all, or particular, modular flight commands. In this way, and as described above, in some implementations control sources can provide modular flight commands greater than a priority level they have been assigned (e.g., a control source can provide a modular flight command indicating that it determined a contingency, and a contingency handler control source can assume control).

The system determines whether a modular flight command can be performed (block 606). The system determines a modular flight command to be implemented from the priority information associated with the control sources. That is, the system selects a control source that is providing a modular flight command that has the highest priority information to be in control of the UAV. After determining a modular flight command to be implemented, the system determines whether modular flight command can be performed. For instance, the system determines whether modular flight command is safe to perform, or is otherwise allowed to be performed. As described above, modular flight commands can be filtered depending on whether implementation of a modular flight command will result in the UAV experiencing a contingency (e.g., flying out of a geofence, traveling too far, traveling too fast, and so on). The modular flight command can also be filtered based on determining that the UAV has entered a particular mode which restricts modular flight commands (e.g., types of commands), or restricts control sources, that can be implemented.

The system implements the modular flight command (block 608). As described above, the system (e.g., the flight control system 220) can receive the modular flight command, and implement the modular flight command. After implementing of the modular flight command, the system can provide a response to the control source indicating completion. In some implementations, the system can provide a response to the control source upon initiation of the modular flight command, and can optionally provide information to each other control source indicating that the modular flight command is being implemented.

Figure 7:
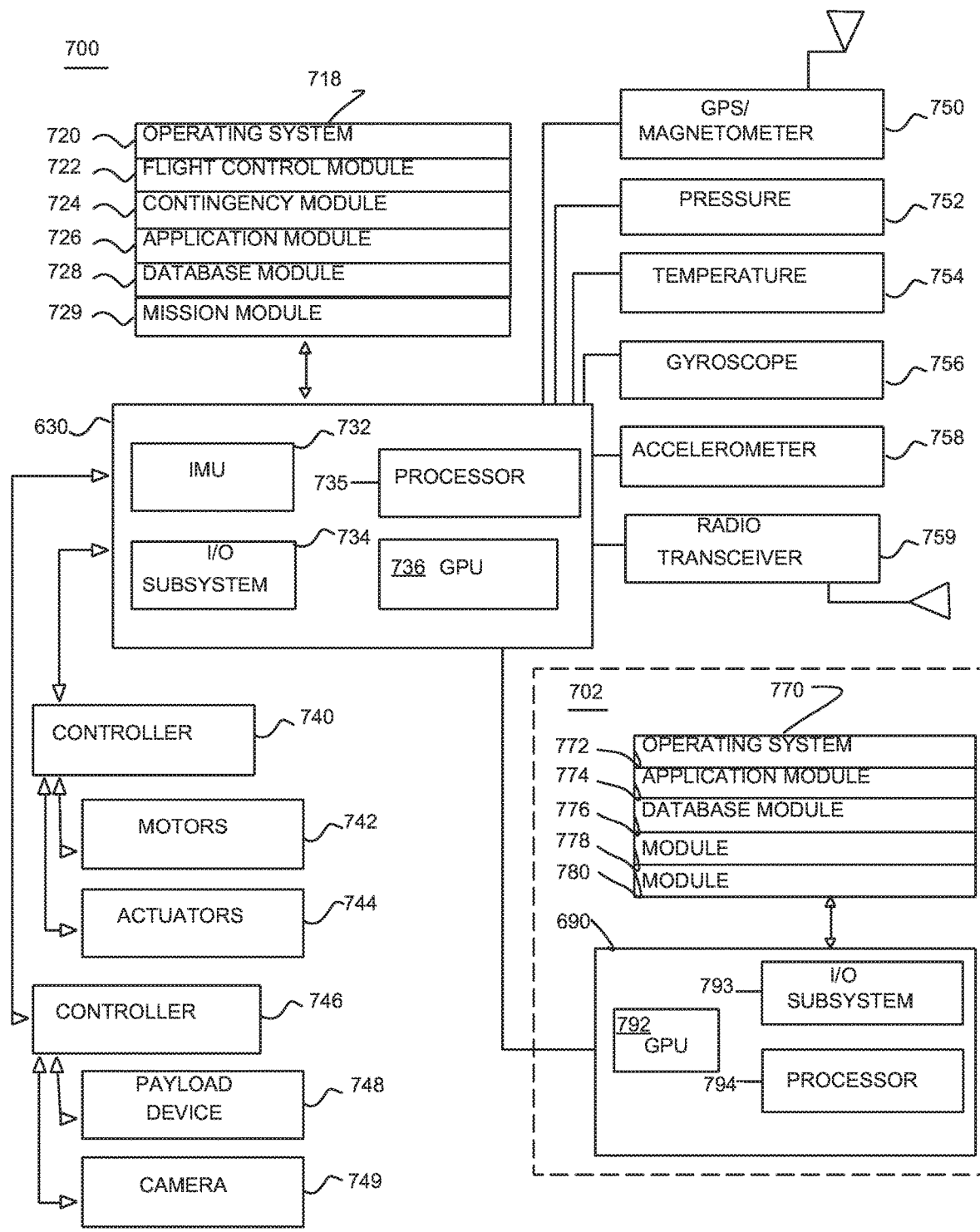
FIG. 7 illustrates a block diagram of an example UAV architecture for implementing the features and processes described herein.

FIG. 7 illustrates a block diagram of an example Unmanned Aerial Vehicle (UAV) architecture for implementing the features and processes described herein. A UAV primary processing system 700 can be a system of one or more computers, or software executing on a system of one or more computers, which is in communication with, or maintains, one or more databases. The UAV primary processing system 700 can be a system of one or more processors 735, graphics processors 736, I/O subsystem 734, logic circuits, analog circuits, associated volatile and/or non-volatile memory, associated input/output data ports, power ports, etc., and/or one or more software processing executing one or more processors or computers. Memory 718 may include non-volatile memory, such as one or more magnetic disk storage devices, solid state hard drives, or flash memory. Other volatile memory such a RAM, DRAM, SRAM may be used for temporary storage of data while the UAV is operational. Databases may store information describing UAV flight operations, flight plans, contingency events, geofence information, component information, and other information.

The UAV processing system may be coupled to one or more sensors, such as GPS receivers 750, gyroscopes 756, accelerometers 758, pressure sensors (static or differential) 752, temperature sensors 754, current sensors, voltage sensors, magnetometer, hydrometer, and motor sensors. The UAV may use an inertial measurement unit (IMU) 732 for use in navigation of the UAV. Sensors can be coupled to the processing system, or to controller boards coupled to the UAV processing system. One or more communication buses, such as a CAN bus, or signal lines, may couple the various sensor and components.

Various sensors, devices, firmware and other systems may be interconnected to support multiple functions and operations of the UAV. For example, the UAV primary processing system 700 may use various sensors to determine the vehicle's current geo-spatial location, attitude, altitude, velocity, direction, pitch, roll, yaw and/or airspeed and to pilot the vehicle along a specified route and/or to a specified location and/or to control the vehicle's attitude, velocity, altitude, and/or airspeed (optionally even when not navigating the vehicle along a specific path or to a specific location).

The flight control module (also referred to as flight control engine) 722 handles flight control operations of the UAV. The module interacts with one or more controllers 740 that control operation of motors 742 and/or actuators 744. For example, the motors may be used for rotation of propellers, and the actuators may be used for flight surface control such as ailerons, rudders, flaps, landing gear, and parachute deployment. In one embodiment, the flight control module 722 also may perform the function of the source determination system. Alternatively, the application module 726 may perform the function of the source determination system.

The mission module 729 processes the flight plan, waypoints, and other associated information with the flight plan. The mission module 729 works in conjunction with the flight control module. For example, the mission module may send information concerning the flight plan to the flight control module, for example lat/long waypoints, altitude, flight velocity, so that the flight control module can autopilot the UAV. In one embodiment, the mission module 729 may perform as the first control source.

The contingency module 724 monitors and handles contingency events. For example, the contingency module may detect that the UAV has crossed a border of a geofence, and then instruct the flight control module to return to a predetermined landing location. Other contingency criteria may be the detection of a low battery or fuel state, or malfunctioning of an onboard sensor, motor, or a deviation from the flight plan. The foregoing is not meant to be limiting, as other contingency events may be detected. In some instances, if equipped on the UAV, a parachute may be deployed if the motors or actuators fail. In one embodiment, the contingency module 624 may perform as the second control source.

The UAV may have various devices connected to it for data collection. For example, photographic camera 749, video cameras, infra-red camera, multispectral camera, and Lidar, radio transceiver, sonar, TCAS (traffic collision avoidance system). Data collected by the devices may be stored on the device collecting the data, or the data may be stored on non-volatile memory 718 of the UAV processing system 600.

The UAV processing system 700 may be coupled to various radios, and transmitters 759 for manual control of the UAV, and for wireless or wired data transmission to and from the UAV primary processing system 700, and optionally the UAV secondary processing system 702. The UAV may use one or more communications subsystems, such as a wireless communication or wired subsystem, to facilitate communication to and from the UAV. Wireless communication subsystems may include radio transceivers, and infrared, optical ultrasonic, electromagnetic devices. Wired communication systems may include ports such as Ethernet, USB ports, serial ports, or other types of port to establish a wired connection to the UAV with other devices, such as a ground control system, cloud-based system, or other devices, for example a mobile phone, tablet, personal computer, display monitor, other network-enabled devices. The UAV may use a light-weight tethered wire to a ground control station for communication with the UAV. The tethered wire may be removeably affixed to the UAV, for example via a magnetic coupler.

Flight data logs may be generated by reading various information from the UAV sensors and operating system and storing the information in non-volatile memory. The data logs may include a combination of various data, such as time, altitude, heading, ambient temperature, processor temperatures, pressure, battery level, fuel level, absolute or relative position, GPS coordinates, pitch, roll, yaw, ground speed, humidity level, velocity, acceleration, contingency information. This foregoing is not meant to be limiting, and other data may be captured and stored in the flight data logs. The flight data logs may be stored on a removable media and the media installed onto the ground control system. Alternatively, the data logs may be wirelessly transmitted to the ground control system or to the cloud system.

Modules, programs or instructions for performing flight operations, contingency maneuvers, and other functions may be performed with the operating system. In some implementations, the operating system 720 can be a real time operating system (RTOS), UNIX, LINUX, OS X, WINDOWS, ANDROID or other operating system.

Additionally, other software modules and applications may run on the operating system, such as a flight control module 722, contingency module 724, application module 726, and database module 728. Typically flight critical functions will be performed using the UAV processing system 700. Operating system 720 may include instructions for handling basic system services and for performing hardware dependent tasks.

In addition to the UAV primary processing system 700, a secondary processing system 702 may be used to run another operating system to perform other functions. A UAV secondary processing system 702 can be a system of one or more computers, or software executing on a system of one or more computers, which is in communication with, or maintains, one or more databases. The UAV secondary processing system 702 can be a system of one or more processors 794, graphics processors 792, I/O subsystem 793 logic circuits, analog circuits, associated volatile and/or non-volatile memory, associated input/output data ports, power ports, etc., and/or one or more software processing executing one or more processors or computers. Memory 770 may include non-volatile memory, such as one or more magnetic disk storage devices, solid state hard drives, flash memory. Other volatile memory such a RAM, DRAM, SRAM may be used for storage of data while the UAV is operational.

The memory 770 includes an operating system 772, an application module 774, a database module 776, a module 778, and a module 780. Ideally modules, applications and other functions running on the secondary processing system 702 will be non-critical functions in nature, that is if the function fails, the UAV will still be able to safely operate. In some implementations, the operating system 772 can be based on real time operating system (RTOS), UNIX, LINUX, OS X, WINDOWS, ANDROID or other operating system. Additionally, other software modules and applications may run on the operating system 772, such as the application module 774, and the database module 776. Operating system 772 may include instructions for handling basic system services and for performing hardware dependent tasks. In one embodiment, the application module 774 may perform as a second control source, or as a third control source.

Also, controllers 746 may be used to interact and operate a payload device 748, and other devices such as photographic camera 749, video camera, infra-red camera, multispectral camera, stereo camera pair, Lidar, radio transceiver, sonar, laser ranger, altimeter, TCAS (traffic collision avoidance system), ADS-B (Automatic dependent surveillance-broadcast) transponder. Optionally, the secondary processing system 702 may have coupled controllers to control payload devices.

Each of the processes, methods, and algorithms described in the preceding sections may be embodied in, and fully or partially automated by, code modules executed by one or more computer systems or computer processors comprising computer hardware. The code modules (or "engines") may be stored on any type of, one or more, non-transitory computer-readable media (e.g., a computer storage product) or computer storage devices, such as hard drives, solid state memory, optical disc, and/or the like. The systems and modules may also be transmitted as generated data signals (for example, as part of a carrier wave or other analog or digital propagated signal) on a variety of computer-readable transmission mediums, including wireless-based and wired/cable-based mediums, and may take a variety of forms (for example, as part of a single or multiplexed analog signal, or as multiple discrete digital packets or frames). The processes and algorithms may be implemented partially or wholly in application-specific circuitry. The results of the disclosed processes and process steps may be stored, persistently or otherwise, in any type of non-transitory computer storage such as, for example, volatile or non-volatile storage.

In general, the terms "engine" and "module", as used herein, refer to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on one or more computer readable media, such as a compact discs, digital video discs, flash drives, or any other tangible media. Such software code may be stored, partially or fully, on a memory device of the executing computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage.

User interfaces described herein are optionally presented (and user instructions may be received) via a user computing device using a browser, other network resource viewer, a dedicated application, or otherwise. Various features described or illustrated as being present in different embodiments or user interfaces may be combined into the same embodiment or user interface. Commands and information received from the user may be stored and acted on by the various systems disclosed herein using the processes disclosed herein. While the disclosure may reference to a user hovering over, pointing at, or clicking on a particular item, other techniques may be used to detect an item of user interest. For example, the user may touch the item via a touch screen, or otherwise indicate an interest. The user interfaces described herein may be presented on a user terminal, such as a laptop computer, desktop computer, tablet computer, smart phone, virtual reality headset, augmented reality headset, or other terminal type. The user terminals may be associated with user input devices, such as touch screens, microphones, touch pads, keyboards, mice, styluses, cameras, etc. While the foregoing discussion and figures may illustrate various types of menus, other types of menus may be used. For example, menus may be provided via a drop down menu, a tool bar, a pop up menu, interactive voice response system, or otherwise.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "for example," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y and Z," unless specifically stated otherwise, is otherwise understood with the context as used in general to convey that an item, term, etc. may be either X, Y or Z. Thus, such conjunctive language is not generally intended to imply that certain embodiments require at least one of X, at least one of Y and at least one of Z to each be present.

While certain example embodiments have been described, these embodiments have been presented by way of example only, and are not intended to limit the scope of the disclosure. Thus, nothing in the foregoing description is intended to imply that any particular element, feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated.

What is claimed is:

1. A method implemented by an unmanned aerial vehicle (UAV) comprising one or more processors, the method comprising:
   receiving, by a source determination system included in the UAV and from a first control source that provides modular commands to the UAV, one or more first modular commands associated with performance by the UAV of one or more actions related to a flight plan for the UAV;
   receiving, by the source determination system included in the UAV and from a second control source that provides modular commands to the UAV, one or more second modular commands associated with performance by the UAV of one or more actions for enforcing an approved geofence in connection with the flight plan;
   filtering, by the source determination system, the one or more received first and second modular commands, thereby discarding from implementation by the UAV one or more of the received first or second modular commands, wherein filtering comprises:
      receiving, from the first control source, repeated instances of the same modular command;
      determining a number of repeated instances of the same modular command that have been received; and
      discarding some of the repeated instances of the same modular command if the number of instances of the repeated modular command exceeds a threshold value;
   determining, during implementation of a non-discarded first modular command under control of the first control source, that the UAV has moved outside of the approved geofence;
   based on the determination that the UAV has moved outside of the approved geofence, transferring control of the UAV to the second control source to implement a non-discarded second modular command for returning the UAV to within the approved geofence; and
   based on the UAV returning to within the approved geofence, transferring control of the UAV to the first control source to continue implementing the non-discarded first modular command.

2. The method of claim 1, wherein filtering comprises:
   receiving from the first control source a modular command to travel to a waypoint;
   determining whether the UAV has sufficient battery capacity to travel to the waypoint; and
   discarding the modular command to travel to the waypoint if the UAV does not have sufficient battery capacity to travel to the waypoint.

3. The method of claim 1, wherein filtering comprises:
   assigning the first control source to perform a group of modular commands; and
   discarding modular commands that were received from a control source other than the assigned first control source for the group of modular commands.

4. The method of claim 1, further comprising:
   determining a priority level associated with the first control source for a particular received modular command; and
   based on the priority level of the first control source, determining whether to enable performance of the modular command by the UAV.

5. The method of claim 1, wherein each modular command is validated for the UAV to implement, and wherein the validation is based on configuration information of the UAV.

6. The method of claim 1, wherein filtering comprises:
   receiving a request to cancel a modular command from a requesting control source that requested the modular command, wherein the requesting control source is the first control source or the second control source; and
   discarding from implementation the modular command requested to be canceled.

7. The method of claim 1, wherein the first control source is an application program executing on a computer system of the UAV.

8. The method of claim 1, further comprising:
   maintaining, by the source determination system, the first modular commands and second modular commands in a queue of modular commands, the queue being in an order based, at least in part, on priority information associated with each control source; and
   enabling, by the source determination system, control of the UAV according to the queue, and implementing modular commands from the queue of modular commands.

9. The method of claim 1, further comprising:
   receiving, from the first control source and based on parameters for a particular modular command and value ranges associated with the parameters, a cancellation request to cancel the particular modular command, wherein the cancellation request is received in conjunction with a unique identifier for the particular command; and discarding from implementation the particular modular command in response to the cancellation request.

10. The method of claim 1, further comprising:
based on a request from the first control source for a particular modular command, providing, to the first control source, value ranges associated with parameters for the particular modular command in conjunction with a unique identifier for the particular modular command.

11. Non-transitory computer storage media storing instructions, that when executed by an unmanned aerial vehicle (UAV) comprising one or more processors, cause the UAV to perform operations comprising:
receiving one or more first modular commands associated with performance of one or more first actions by the UAV from a first control source within the UAV;
receiving one or more second modular commands associated with performance of one or more second actions by the UAV from a second control source within the UAV, the second actions corresponding to enforcing an approved geofence for the UAV;
discarding a subset of the one or more first modular commands and the one or more second modular commands, wherein discarding comprises:
receiving, from the first control source, repeated instances of the same modular command;
determining a number of repeated instances that the same modular command has been received; and
discarding some of the repeated instances of the same modular command if the number of instances of the repeated modular command exceeds a threshold value;
determining, while the UAV is under control of the first control source, that the UAV has moved outside of the approved geofence;
based on the UAV moving outside of the approved geofence, transferring control of the UAV to the second control source for returning the UAV to within the approved geofence; and
based on the UAV returning to within the approved geofence, returning control of the UAV to the first control source.

12. The computer storage media of claim 11, wherein discarding comprises:
receiving from the first control source a modular command to travel to a waypoint;
determining whether the UAV has sufficient battery capacity to travel to the waypoint; and
discarding the modular command to travel to the waypoint if the UAV does not have sufficient battery capacity to travel to the waypoint.

13. The computer storage media of claim 11, wherein discarding comprises:
assigning the first control source to perform a group of modular commands; and
discarding modular commands that were received from a control source other than the assigned first control source for the group of modular commands.

14. The computer storage media of claim 11, wherein the operations further comprise:
determining a priority level associated with the first control source for a particular received modular command; and
based on the priority level of the first control source, determining whether to enable performance of the modular command by the UAV.

15. The computer storage media of claim 11, wherein each modular command is validated for the UAV to implement, and wherein the validation is based on configuration information of the UAV.

16. The computer storage media of claim 11, wherein discarding comprises:
receiving a request from the first or second control source to cancel a modular command; and
discarding from implementation the modular command requested to be canceled.

17. The computer storage media of claim 11, wherein the first control source is an application program executing on a computer system of the UAV.

18. The computer storage media of claim 11, wherein the operations further comprise:
maintaining the first modular commands and second modular commands in a queue of modular commands, the queue being in an order based, at least in part, on priority information associated with each control source; and
enabling control of the UAV according to the queue and implementing modular commands from the queue of modular commands.

19. An unmanned aerial vehicle (UAV) system, comprising:
one or more processors; and
one or more computer storage media storing instructions, that when executed by the one or more processors, cause the one or more processors to:
receive, from a first control source, one or more first modular commands;
receive, from a second control source, one or more second modular commands associated with enforcing an approved geofence for the UAV;
filter the one or more first and second modular commands to discard a subset of the one or more first and second modular commands from implementation by the UAV, wherein, to filter the one or more first and second modular commands, the one or more processors are configured to execute the instructions to:
receive, from the first control sources, repeated instances of the same modular command;
determine a number of repeated instances that the same modular command has been received; and
discard some of the repeated instances of the same modular command if the number of instances of the repeated modular command exceeds a threshold value;
determine, while the UAV is under control of the first control source, that the UAV has moved outside of the approved geofence;
based on the UAV moving outside of the approved geofence, transfer control of the UAV to the second control source to return the UAV to within the approved geofence; and
based on the UAV returning to within the approved geofence, transfer control of the UAV to the first control source.

20. The system of claim 19, wherein, to filter the one or more first and second modular commands, the one or more processors are configured to execute the instructions to:
receive from the first control source a modular command to travel to a waypoint;
determine whether the UAV has sufficient battery capacity to travel to the waypoint; and discard the modular command to travel to the waypoint if the UAV does not have sufficient battery capacity to travel to the waypoint.

21. The system of claim 19, wherein, to filter the one or more first and second modular commands, the one or more processors are configured to execute the instructions to:
   assign the first control source to perform a group of modular commands; and
   discard modular commands that were received from a control source other than the assigned first control source for the group of modular commands.

22. The system of claim 19, wherein the one or more processors are configured to execute the instructions to:
   determine a priority level associated with the first control source for a particular received modular command; and
   based on the priority level of the first control source, determine whether to enable performance of the modular command by the UAV.

23. The system of claim 19, wherein each modular command is validated for the UAV to implement, and wherein the validation is based on configuration information of the UAV.

24. The system of claim 19, wherein, to filter the one or more first and second modular commands, the one or more processors are configured to execute the instructions to:
   receive a request from the first or second control source to cancel a modular command; and
   discard from implementation the modular command requested to be canceled.

25. The system of claim 19, wherein the first control source is an application program executing on a computer system of the UAV.

26. The system of claim 19, wherein the one or more processors are configured to execute the instructions to:
   maintain the first modular commands and second modular commands in a queue of modular commands, the queue being in an order based, at least in part, on priority information associated with each control source; and
   enable control of the UAV according to the queue and implement modular commands from the queue of modular commands.

* * * * *